US012681418B2

(12) United States Patent
Nomura

(10) Patent No.: US 12,681,418 B2
(45) Date of Patent: Jul. 14, 2026

(54) IMAGE FORMING APPARATUS AND RECORDING MEDIUM

(71) Applicant: Konica Minolta, Inc., Tokyo (JP)

(72) Inventor: Shoichi Nomura, Machida (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/655,525

(22) Filed: May 6, 2024

(65) Prior Publication Data

US 2024/0377780 A1 Nov. 14, 2024

(30) Foreign Application Priority Data

May 9, 2023 (JP) ................................. 2023-077138

(51) Int. Cl.
*G03G 15/01* (2006.01)
*G03G 15/00* (2006.01)

(52) U.S. Cl.
CPC ..... *G03G 15/5062* (2013.01); *G03G 15/0105* (2013.01); *G03G 15/0189* (2013.01); *G03G 15/5029* (2013.01); *G03G 15/6564* (2013.01)

(58) Field of Classification Search
CPC ........... G03G 15/5062; G03G 15/0105; G03G 15/0189; G03G 15/5029; G03G 15/6564; G03G 15/6561; G03G 15/6567
See application file for complete search history.

(56) References Cited

U.S. PATENT DOCUMENTS

| | | | | | |
|---|---|---|---|---|---|
| 5,839,016 | A * | 11/1998 | Folkins | G03G 15/0152 | 399/46 |
| 2002/0067925 | A1* | 6/2002 | Yamano | H04N 1/00045 | 399/1 |
| 2002/0164173 | A1* | 11/2002 | Osada | G03G 15/5008 | 399/68 |
| 2009/0231621 | A1* | 9/2009 | Kuwahara | G03G 15/5087 | 358/1.15 |
| 2010/0220342 | A1* | 9/2010 | Takata | G06K 15/1878 | 358/1.9 |

(Continued)

FOREIGN PATENT DOCUMENTS

| | | | | |
|---|---|---|---|---|
| JP | 2012194361 | A * | 10/2012 | B41J 11/008 |
| JP | 2018084617 | A | 5/2018 | |

(Continued)

OTHER PUBLICATIONS

Machine translation of Furuya.*
Machine translation of Hayakawa.*
Machine translation of Harada.*

*Primary Examiner* — Sevan A Aydin
(74) *Attorney, Agent, or Firm* — RANKIN, HILL & CLARK LLP

(57) ABSTRACT

An image forming apparatus includes, an image former that forms an image in a plurality of colors on a sheet by an intermediate transfer method; and a hardware processor that acquires sheet attribute information indicating an attribute of the sheet, wherein, the hardware processor measures a color misregistration amount at a predetermined position in a surface of the sheet on which the image is formed by the image former; and the hardware processor performs control for correcting at least the color misregistration on the surface of the sheet, based on the acquired sheet attribute information and the measured color misregistration amount.

18 Claims, 15 Drawing Sheets

(56) References Cited

U.S. PATENT DOCUMENTS

| | | | | |
|---|---|---|---|---|
| 2011/0188891 | A1* | 8/2011 | Ryu | G03G 15/1615 399/121 |
| 2013/0164047 | A1* | 6/2013 | Kakutani | G03G 15/0189 399/301 |
| 2015/0055146 | A1* | 2/2015 | Kurigata | G03G 15/041 358/1.1 |
| 2016/0147175 | A1* | 5/2016 | Ohkubo | G03G 15/0189 399/301 |
| 2017/0038714 | A1* | 2/2017 | Yamana | G03G 15/2053 |
| 2018/0309886 | A1* | 10/2018 | Shiokawa | H04N 1/00774 |
| 2018/0341212 | A1* | 11/2018 | Shiokawa | G03G 15/6564 |
| 2019/0049872 | A1* | 2/2019 | Mori | G03G 15/0806 |
| 2022/0308512 | A1* | 9/2022 | Mori | H04N 1/00761 |
| 2022/0365733 | A1* | 11/2022 | Hikichi | G06F 3/1208 |
| 2022/0390888 | A1* | 12/2022 | Onaka | G03G 15/6567 |
| 2024/0288816 | A1* | 8/2024 | Maehara | G03G 15/5062 |

FOREIGN PATENT DOCUMENTS

| | | | | |
|---|---|---|---|---|
| JP | 2018180171 | A * | 11/2018 | G03G 15/1615 |
| JP | 6624840 | B2 | 12/2019 | |

* cited by examiner

| BASIS WEIGHT[g/m$^2$] | REGISTRATION SPEED | FIXING SPEED |
|---|---|---|
| 200~250 | 0.2~0.4% | 0% |
| 251~300 | 0.3~0.6% | 0.2~0.3% |
| 301~350 | 0.5~0.8% | 0.2~0.4% |
| 351~400 | 0.6~1.2% | 0.3~0.6% |
| 401~450 | 1.0~2.4% | 0.5~1.0% |

IMAGE FORMING APPARATUS AND RECORDING MEDIUM

BACKGROUND OF THE INVENTION

Technical Field

The present invention relates to an image forming apparatus and a recording medium.

Description of Related Art

In the production printing market, there are an increasing number of fields where thick paper is highly needed. In recent years, with an increase in needs, in electrophotographic method printing using intermediate transfer, color misregistration in a paper feeding direction in which thick paper is easily affected by printing has been actualized as a problem.

In relation to this, Japanese Patent No. 6624840 discloses an image forming apparatus that controls a conveyance speed of a sheet at a transfer nip part and a conveyance speed of the sheet at a fixing nip part to prevent occurrence of color misregistration.

Japanese Unexamined Patent Publication No. 2018-84617 discloses an image forming apparatus that suppresses color misregistration in printed matter by performing color misregistration correction according to the thickness of sheets in continuous printing.

However, basis weight, size, paper type, and the like of sheets to be printed are various. Even sheets having the same basis weight, size, paper type, and the like may have different smoothness, water content, stiffness, and the like depending on the type, lot, storage environment, and the like. In this case, the conventional color misregistration correction processing cannot cope with the color misregistration, and the color misregistration correction may be insufficient.

SUMMARY OF THE INVENTION

An object of the present invention is to provide an image forming apparatus and a recording medium that can accurately correct color misregistration in an image formed on a sheet.

To achieve at least one of the abovementioned objects, according to an aspect of the present invention, an image forming apparatus reflecting one aspect of the present invention includes: an image former that forms an image in a plurality of colors on a sheet by an intermediate transfer method; and a hardware processor that acquires sheet attribute information indicating an attribute of the sheet, wherein, the hardware processor measures a color misregistration amount at a predetermined position in a surface of the sheet on which the image is formed by the image former; and the hardware processor performs control for correcting at least the color misregistration on the surface of the sheet, based on the acquired sheet attribute information and the measured color misregistration amount.

To achieve at least one of the abovementioned objects, according to an aspect of the present invention, a non-transitory recording medium including a program that controls a computer of an image forming apparatus including an image former for forming images in a plurality of colors on a sheet by an intermediate transfer method to functions as: a hardware processor that acquires sheet attribute information indicating an attribute of the sheet, wherein, the hardware processor measures a color misregistration amount at a predetermined position in a surface of the sheet on which the image is formed by the image former; and the hardware processor performs control to correct at least the color misregistration on the surface of the sheet based on the acquired sheet attribute information and the measured color misregistration amount.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Hereinafter, one or more embodiments of the present invention will be described with reference to the drawings. However, the scope of the invention is not limited to the disclosed embodiments.

Hereinafter, embodiments of the present invention will be described in detail with reference to the drawings.

1. Configuration of Image Forming Apparatus

Figure 1:
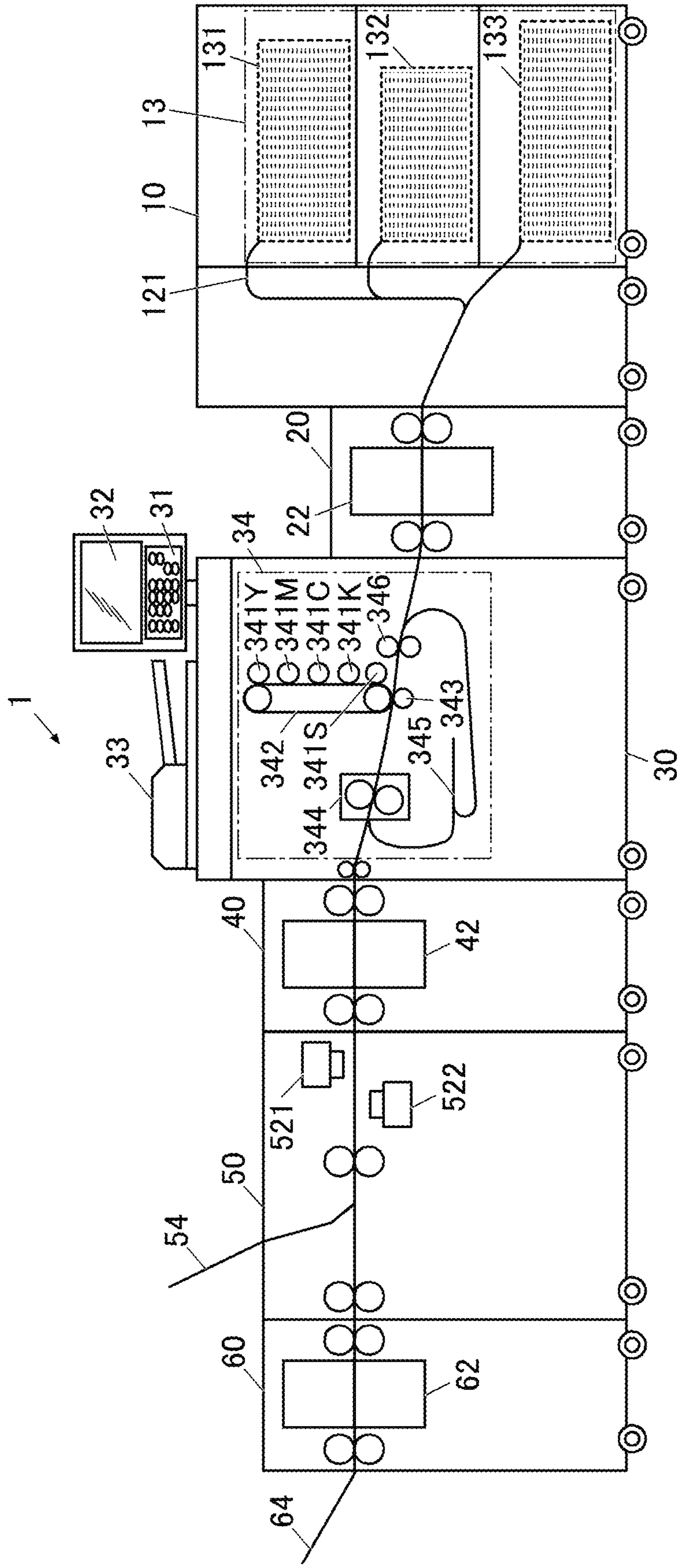
FIG. 1 is a front view illustrating a schematic configuration of an image forming apparatus according to the present embodiment.
Figure 2:
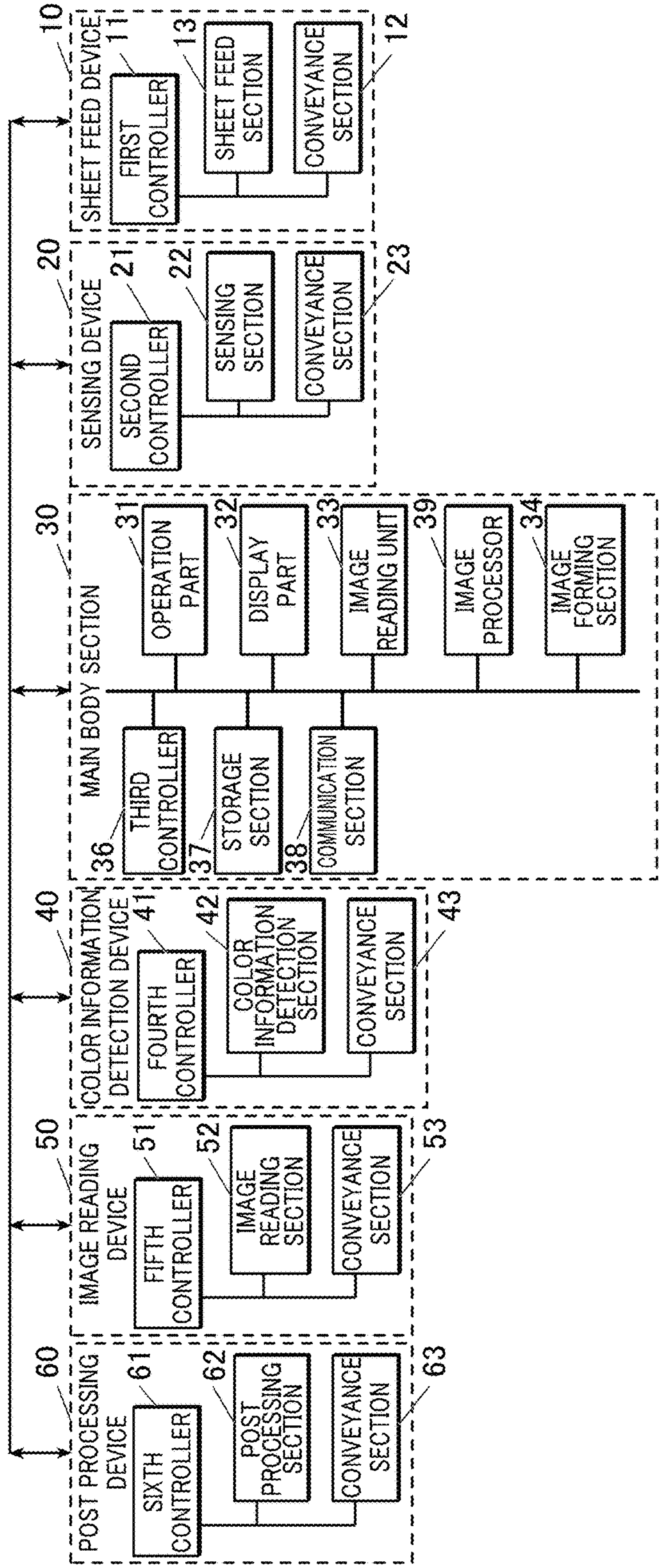
FIG. 2 is a functional block diagram illustrating a control structure of the image forming apparatus according to the present embodiment.

As shown in FIGS. 1 and 2, the image forming apparatus 1 according to the present embodiment includes a sheet feed device 10, a sensing device 20, a main body section 30, a color information detection device 40, an image reading device 50, and a post processing device 60.

In the image forming apparatus 1, the sheet feed device 10, the sensing device 20, the main body section 30, the color information detection device 40, the image reading device 50, and the post processing device 60 are arranged in this order from the upstream side along the conveyance direction of the sheet.

(1-1. Configuration of Sheet Feed Device) The sheet feed device 10 includes a first controller 11 (hardware processor), a conveyance section 12, and a sheet feed section 13.

The first controller 11 includes a central processing unit (CPU), a read only memory (ROM), a random access memory (RAM), and the like.

The CPU of the first controller 11 reads a program stored in the ROM, deploys the program in the RAM, and integrally controls each unit of the sheet feed device 10 according to the deployed program.

For example, the first controller 11 conveys a sheet from any one of the sheet feed trays 131 to 133 of the sheet feed section 13 to the sensing device 20 according to a job.

The conveyance section 12 includes a conveyance path 121 connecting from the sheet feed section 13 to the sensing device 20, and conveys a sheet.

The sheet feed section 13 includes sheet feed trays 131 to 133 that store sheets by predetermined paper type and size. For example, the sheet feed tray 131 stores sheets having a larger size than the sheets stored in the sheet feed tray 132. The sheet feed tray 133 stores sheets having a greater sheet thickness than the sheets stored in the sheet feed trays 131 and 132.

(1-2. Configuration of Sensing Device)

The sensing device 20 is located on the downstream side of the sheet feed device 10 in the sheet conveyance direction and on the upstream side of the main body section 30 in the sheet conveyance direction.

The sensing device 20 senses a physical property of the sheet conveyed from the sheet feed device 10 and outputs a physical property value which is an obtained sensing result to a third controller 36 which will be described later.

The sensing device 20 senses values (physical property values) relating to physical properties of a plurality of types of sheets including basis weight, stiffness, moisture content, surface properties, and the like of the sheets. The physical property value may be information that can be converted (transformed) into a physical property.

The sensing device 20 may include, for example, an image sensor, an illumination section, and the like therein to read an image of an outer shape of the sheet. In this case, the sensing device 20 may sense the sheet size, for example, in millimeters or as a representative sheet size such as A4 vertical feed. The sheet size is, for example, a length in a sheet conveyance direction and a width in a direction orthogonal thereto. The A4 vertical feed in this case is 297 mm long in the sheet conveyance direction and the sheet-width is 210 mm wide. Each of the sheet feed trays 131 to 133 often includes a sensor capable of roughly sensing the sheet size. In this case, the sensing device 20 can sense the sheet size more precisely and reliably.

The sensing device 20 includes a second controller 21 (hardware processor), a sensing section 22, a conveyance section 23, and the like.

The second controller 21 includes a CPU, a ROM, and a RAM.

The CPU of the second controller 21 reads a program stored in the ROM, deploys the program in the RAM, and integrally controls each unit of the sensing device 20 according to the deployed program.

For example, the second controller 21 causes the sensing section 22 to sense the sheet conveyed from the sheet feed device 10 and outputs the obtained physical property value to the third controller 36. Next, the second controller 21 causes the conveyance section 23 to convey the sensed sheet to the main body section 30.

The sensing section 22 senses the physical property value in the sheet.

The sensing section 22 includes sensors that sense the basis weight, stiffness, moisture content, surface property, and the like of the sheet as physical property values of the sheet.

For example, a sensor that senses the basis weight of a sheet includes a light emitting section and a light receiving section, and measures the basis weight based on an amount of attenuation of light transmitted through the sheet. The sensing section 22 outputs the basis weight as the physical property value to the second controller 21.

The sensor that senses the stiffness of the sheet senses the physical property corresponding to the stiffness of the sheet. For example, when a sheet is conveyed in a curved conveyance path, the sensor mechanically measures, in the curved conveyance path, the force with which the sheet presses one of outer guide plates constituting the conveyance path or an amount of displacement. The sensing section 22 outputs, to the second controller 21, the stiffness as the physical property value based on the force applied by the sheet or the amount of displacement.

The sensor that senses the moisture content of the sheet optically senses, for example, a light absorption amount of an OH group of a near-infrared method. The sensor irradiates the sheet with light having a predetermined wavelength in a near-infrared region, and senses the moisture content of the sheet by using a property in which absorptivity of light changes in accordance with the moisture content of the sheet. As another example, the sensor may measure the moisture content by measuring a change in the amount of light of a reflected component inside the sheet using reflected light separated by a polarizing filter. The sensing section 22 outputs the moisture content as the physical property value to the second controller 21.

The sensor that senses the surface properties (smoothness, evenness) of the sheet includes, for example, a reflection sensor that outputs the intensity and/or the intensity ratio of the specular reflection light and the scattered reflection light of the light applied to the sheet. The sensor measures a surface property based on the intensity ratio. The sensing section 22 outputs the surface property as the physical property value to the second controller 21.

The sensing section 22 may include, in addition to the above-described sensors, a sensor that senses the specific gravity, the conductivity, and the like of the sheet.

The conveyance section 23 includes a plurality of roller pairs, and conveys the sheet conveyed from the sheet feed device 10 to the sensing section 22.

Next, the conveyance section 23 conveys the sheet sensed by the sensing section 22 to the main body section 30.

(1-3. Configuration of Main Body Section)

The main body section 30 is located on the downstream side of the sensing device 20 in the sheet conveyance direction and on the upstream side of the color information detection device 40 in the sheet conveyance direction.

The main body section 30 forms a color image by an electrophotographic method based on image data obtained by reading an image from a document or job image data of a print job received from an external apparatus (not shown). Next, the main body section 30 conveys the sheet on which the image has been formed to the color information detection device 40.

As shown in FIGS. 1 and 2, the main body section 30 includes an operation part 31, a display part 32, a document reading unit 33, an image forming section (image former) 34, a third controller 36 (hardware processor), a storage section (storage) 37, a communication section 38, and an image processing section 39.

The operation part 31 includes a touch screen formed in such a manner as to cover a display screen of the display part 32, and various operation buttons such as numeric buttons and a start button.

The operation part 31 outputs an operation signal based on a user operation to the third controller 36.

The display part 32 includes a liquid crystal display (LCD) or the like.

The display part 32 displays various screens according to an instruction of a display signal input from the third controller 36.

The image reading unit 33 includes an automatic document feeder (ADF), a scanner, and the like.

The image reading unit 33 outputs the image data obtained by reading the image of the document to the third controller 36.

The image forming section 34 forms an image by an intermediate transfer method on the sheet conveyed from the sensing device 20, based on the image data subjected to the image processing by the image processing section 39. In the present embodiment, the sheet is a flat cut sheet.

The image forming section 34 includes photosensitive drums 341Y, 341M, 341C, 341K, and 341S corresponding to respective colors of yellow (Y), magenta (M), cyan (C), black (K), and spot colors, an intermediate transfer belt 342, a secondary transfer roller 343, a fixing section (fixer) 344, an inverting path 345, and a registration section 346.

The image forming section 34 uniformly charges the photosensitive drum 341Y, and then scans and exposes the photosensitive drum 341Y with a laser beam based on the image data of the yellow color. Thus, the image forming section 34 forms an electrostatic latent image on the photosensitive drum 341Y. Next, the image forming section 34 makes a yellow toner adhere to the electrostatic latent image on the photosensitive drum 341Y to perform development.

The photosensitive drums 341M, 341C, 341K, and 341S are similar to the photosensitive drum 341Y except that the colors to be handled are different, and thus the description thereof will be omitted.

The image forming section 34 sequentially transfers the toner images in the respective colors formed on the photosensitive drums 341Y, 341M, 341C, 341K, and 341S onto the rotating intermediate transfer belt 342 (primary transfer). That is, the image forming section 34 forms a color toner image in which toner images of five colors are superimposed on the intermediate transfer belt 342.

The image forming section 34 collectively transfers the color toner image on the intermediate transfer belt 342 onto the sheet by the secondary transfer roller 343 (secondary transfer). A nip portion formed by the intermediate transfer belt 342 and the secondary transfer roller 343 is a transfer section.

The fixing section 344 includes a heating roller that heats the sheet onto which the color toner image has been transferred, a pressure roller that pressurizes the sheet, and the like.

The fixing section 344 fixes the color toner image on the sheet by heating with the heating roller and pressurizing with the pressure roller.

In the case of single-sided printing in which an image is formed on one side of a sheet in the main body section 30, the third controller 36 conveys the sheet from the fixing section 344 to the color information detection device 40.

On the other hand, in double-sided printing in which images are formed on both sides of the sheet, the third controller 36 conveys the sheet from the fixing section 344 to the inverting path 345 and inverts the side of the sheet. Next, the third controller 36 feeds the sheet again to the upstream side of the registration section 346 in the sheet conveyance direction.

The registration section 346 includes a registration roller and conveys the sheet to the transfer section.

The registration section 346 corrects the inclination of the sheet conveyed from the sensing device 20 and adjusts the conveyance timing of the sheet.

The third controller 36 includes a CPU, a RAM, and a ROM.

The CPU of the third controller 36 reads various processing programs stored in the ROM, and deploys them in the RAM. The third controller 36 integrally controls the operation of the main body section 30 in cooperation with various programs deployed in the RAM.

For example, when performing post-processing on the output sheet, the third controller 36 instructs the post processing device 60 to perform predetermined post-processing.

The storage section 37 is a non-volatile storage device such as a hard disk drive (HDD) or a semiconductor memory that stores various data such as programs and image data.

The storage section 37 stores data such as program data and various types of setting data in a manner readable and writable by the third controller 36.

The storage section 37 stores the sheet feed trays 131 to 133 and information on the basis weight, size, paper type, and the like of the sheets stored therein in association with each other.

The communication section 38 includes a communication control card such as a local area network (LAN) card.

The communication section 38 exchanges various kinds of data with an external device (e.g., a personal computer) connected to a communication network such as a LAN or a wide area network (WAN).

The image processing section 39 performs necessary image processing on the image data stored in the storage section 37, the image data obtained by reading the image from the document by the image reading unit 33, or the image data input from the external device. Next, the image processing section 39 transmits the image data after the image processing to the image forming section 34.

The image processing includes tone processing, halftone processing, color conversion processing, and the like. The tone processing is processing for converting a tone value of each pixel of the image data into the tone value corrected such that the gray level properties of the image formed on the sheet matches the target gray level properties. The halftone processing is error diffusion processing, screen processing using a systematic dither method, or the like. The color conversion processing is processing for converting each tone value of RGB into each tone value of CMYK.

(1-4. Configuration of Color Information Detection Device)

The color information detection device 40 is located on the downstream side of the main body section 30 in the sheet conveyance direction and on the upstream side of the image reading device 50 in the sheet conveyance direction.

The color information detection device 40 detects color information of the sheet conveyed from the main body section 30, and outputs the obtained detection result to the third controller 36.

The color information detection device 40 includes a fourth controller 41 (hardware processor), a color information detection section 42, a conveyance section 43, and the like.

The fourth controller 41 includes a CPU, a ROM, and a RAM.

The CPU of the fourth controller 41 reads a program stored in the ROM, deploys the program in the RAM, and integrally controls each unit of the color information detection device 40 according to the deployed program.

For example, the fourth controller 41 causes the color information detection section 42 to detect color information of an image formed on the sheet conveyed from the main body section 30, and outputs the obtained detection result to the third controller 36. Next, the fourth controller 41 conveys the detected sheet to the image reading device 50 by the conveyance section 43.

The color information detection section 42 detects color information in the sheet.

The color information detection section 42 includes a color sensor including, for example, red (R), green (G), and blue (B) light emitting diodes (LEDs), lenses, and light receiving elements.

The color information detection section 42 irradiates the image formed on the sheet with light from the LEDs, detects color information from the amount of reflection of the light, and outputs the color information to the fourth controller 41.

The conveyance section 43 includes a plurality of roller pairs, and conveys the sheet conveyed from the main body section 30 to the color information detection section 42.

Next, the conveyance section 43 conveys the sheet detected by the color information detection section 42 to the image reading device 50.

(1-5. Configuration of Image Reading Device)

The image reading device 50 is located on the downstream side of the color information detection device 40 in the sheet conveyance direction and on the upstream side of the post processing device 60 in the sheet conveyance direction.

The image reading device 50 reads the conveyed sheet from the color information detection device 40, and outputs data of the obtained read image to the third controller 36.

The image reading device 50 includes a fifth controller 51 (hardware processor), an image reading section 52, a conveyance section 53, and a sheet ejection tray 54 which is a purge tray.

The sheet ejection tray 54 is provided between the image reading section 52 and the post processing device 60, and purges sheets.

The fifth controller 51 includes a CPU, a ROM, and a RAM.

The CPU of the fifth controller 51 reads a program stored in the ROM, deploys the program in the RAM, and integrally controls each unit of the image reading device 50 according to the deployed program.

For example, the fifth controller 51 allows the image reading section 52 to read the sheet conveyed from the color information detection device 40 and outputs the obtained data of the read image to the third controller 36. Next, the fifth controller 51 conveys the read sheet to the post processing device 60 by the conveyance section 53, or ejects the read sheet to the sheet ejection tray 54.

The image reading section 52 includes reading sections 521 and 522.

The reading section 521 reads an image on one side of the sheet and acquires read image data.

The reading section 522 reads an image on the other side of the sheet and acquires read image data.

The reading sections 521 and 522 each include a line image sensor and an illumination section.

In the line image sensor, a plurality of imaging elements (e.g., charge coupled devices (CCDs)) that performs photoelectrical conversion for each pixel are one dimensionally arranged in the width direction of the sheet.

The width direction of the sheet is orthogonal to the sheet conveyance direction.

The illumination section irradiates the sheet with light in order to enable appropriate reading of the sheet. The illumination section is composed of, for example, an LED, a diffusion member which uniformly spreads the emitted light over the reading range, and the like.

The reading sections 521 and 522 may include a contact image sensor (CIS) in which a line image sensor and an illumination unit are integrated, a two dimensional area sensor and an illumination unit, or the like.

The image reading section 52 reads the upper surface, the lower surface, or both surfaces of the sheet conveyed from the color information detection device 40 by the reading sections 521 and 522. Next, the image reading section 52 outputs the generated read image as a reading result to the fifth controller 51.

The image reading section 52 may include a background member serving as the background of the sheet image when the sheet is read by the line image sensor or the like.

The conveyance section 53 includes a plurality of roller pairs, and conveys the sheet conveyed from the color information detection device 40 to the image reading section

52. Next, the conveyance section 53 conveys the sheet read by the image reading section 52 to the post processing device 60 or discharges the sheet to the sheet ejection tray 54 under the control of the fifth controller 51. For example, the conveyance section 53 conveys a sheet having no defect (normal sheet) to the post processing device 60. On the other hand, the conveyance section 53 ejects a faulty sheet (abnormal sheet) to the sheet ejection tray 54.

(1-6. Configuration of Post Processing Device)

The post processing device 60 is located on the downstream side of the image reading device 50 in the sheet conveyance direction, and performs post processing on the sheet conveyed from the image reading device 50.

The post processing device 60 includes a sixth controller 61 (hardware processor), a post processing section 62, a conveyance section 63, and a sheet ejection tray 64.

The sixth controller 61 includes a CPU, a RAM, and a ROM.

The CPU of the sixth controller 61 reads various processing programs stored in the ROM, and deploys the programs in the RAM. The sixth controller 61 integrally controls the operation of the post processing device 60 in cooperation with various programs developed in the RAM.

The post processing section 62 performs post-processing on the sheet conveyed from the image reading device 50. The post-processing is, for example, cutting, folding processing, perforation processing, creasing, foil stamping, varnish processing, various kinds of bookbinding, or the like.

The conveyance section 63 includes a plurality of roller pairs, and conveys the sheet conveyed from the image reading device 50 to the post processing section 62.

Next, the conveyance section 63 ejects the sheet subjected to post processing by the post processing section 62 to the sheet ejection tray 64.

In the present embodiment, the third controller 36 of the main body section 30 integrally controls the entire image forming apparatus 1, but the present invention is not limited thereto. The second controller 21 of the sensing device 20, the fourth controller 41 of the color information detection device 40, or the fifth controller 51 of the image reading device 50 may comprehensively control the entire image forming apparatus 1.

In the image forming apparatus 1, the main body section 30 forms a chart on a target sheet of a print job before executing the print job. The chart is a chart for measuring a color misregistration amount between at least two colors of yellow (Y), magenta (M), cyan (C), black (K), and a spot color in an image formed by the main body section 30.

(1-7. Another Example of Configuration of Image Forming Apparatus 1)

For example, the image forming apparatus 1 may not include the image reading device 50. In this case, the user places, on the image reading unit 33, a sheet on which a chart has been formed by the main body section 30 and which has been ejected. The image reading unit 33 reads the placed sheet on which the chart has been formed, and outputs read image data as a reading result to the third controller 36. The third controller 36 acquires read image data read by the image reading unit 33.

Alternatively, in this case, the user places the ejected sheet, on which the chart has been formed by the main body section 30, on the external scanner. The scanner is communicably connected to the image forming apparatus 1. The scanner reads the placed sheet on which the chart has been formed, and transmits read image data as a reading result to the image forming apparatus 1. The third controller 36 acquires read image data read by the scanner.

Figure 3A:
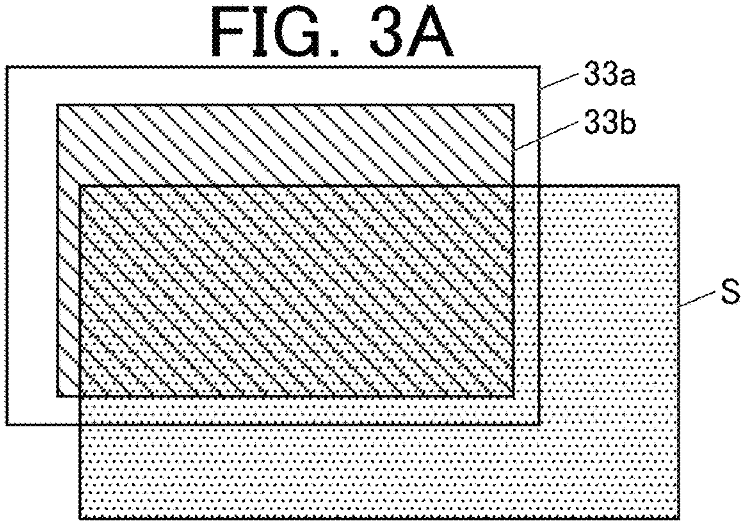
FIG. 3A is a diagram illustrating an example in which a sheet on which a chart has been formed is read by a document reading unit.

FIG. 3A illustrates an example in which the image reading unit 33 reads a sheet S on which a chart has been formed. The same applies to a case where an external scanner reads a sheet on which a chart has been formed. As illustrated in FIG. 3A, the sheet S on which the chart has been formed may be larger than a readable range 33*b* in a device upper surface 33*a* of the image reading unit 33. The size of the readable range 33*b* is, for example, an A3 size. In this case, the user needs to cut the sheet S and place the portion of the sheet S where the chart is formed within the readable range 33*b*.

Figure 3B:
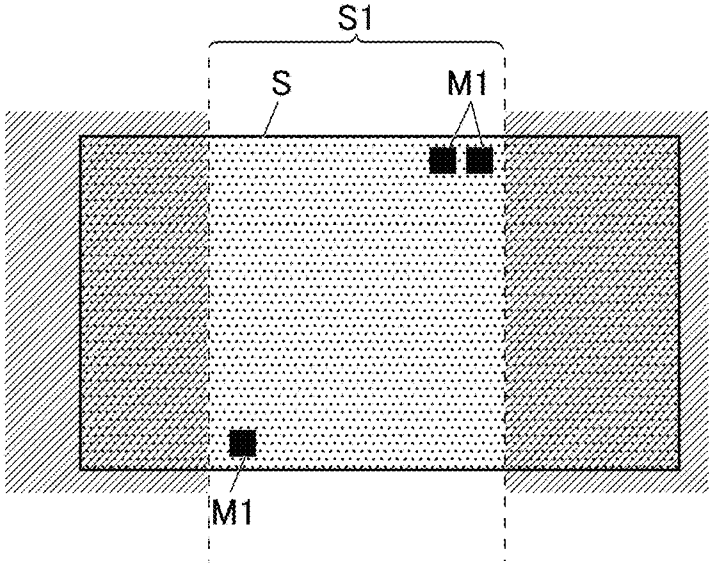
FIG. 3B illustrates an example of a sheet on which a mark has been formed.
Figure 3C:
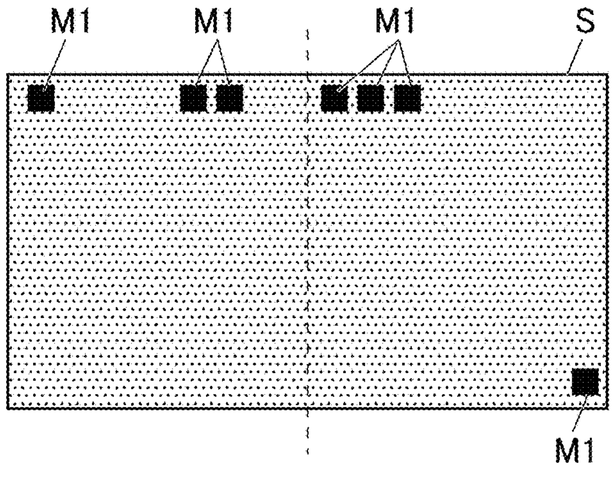
FIG. 3C illustrates an example of a sheet on which a mark has been formed.

When cutting the sheet S, as illustrated in FIGS. 3B and 3C, the main body section 30 forms a mark M1 on the sheet S. The mark M1 is a mark for identifying, by the position where the mark M1 is formed and the number of marks M1, which portion of the original sheet S the cut piece after cutting is. In the examples illustrated in FIGS. 3B and 3C, broken lines indicate cutting lines.

The example illustrated in FIG. 3B is a case where the image reading unit 33 reads only a read portion S1 in the sheet S. In this case, the main body section 30 forms the mark M1 at an end portion or a corner portion of the read portion M1.

The example illustrated in FIG. 3C is a case where the image reading unit 33 reads the entire surface of the sheet S. In this case, the main body section 30 forms the mark M1 at an end or a corner of the sheet S. The mark M1 is not limited to the examples illustrated in FIGS. 3B and 3C, and may be a mark having any other shape.

The third controller 36 may perform correction such as rotating the image read by the document reading unit 33 or changing the order of the read image based on the mark M1.

When the sheet S is cut, the third controller 36 may form, on the sheet S, cutting lines, a cutting method, a method of measuring the amount of color misregistration after cutting, information on the chart, and the like so that the user can easily perform the operation. The third controller 36 may form, on the sheet S, a mark, a number, an explanatory note, various barcodes such as a QR code (registered trademark), and the like indicating these pieces of information.

The image forming apparatus 1 may not include the color information detection device 40. In this case, the user forms the image by the main body section 30 and measures the ejected sheet by an external colorimeter. The user inputs a colorimetry result of the colorimeter via the operation part 31. The third controller 36 acquires the input colorimetry result.

Alternatively, in this case, the user measures the color misregistration amount by visually observing the sheet on which the chart is formed by the main body section 30 and which is ejected. The user inputs a visual measurement result via the operation part 31. The third controller 36 acquires the input visual measurement result.

2. Chart

Next, a description is given of a chart for measuring a color misregistration amount during image formation by the main body section 30.

(2-1. Image Reading Chart)

A case will be described where a chart formed on a target sheet is read by the image reading device 50, the image reading unit 33, or an external scanner, and the amount of color misregistration of each color in each direction is measured based on the read image as a reading result. In this case, the main body section 30 forms an image reading chart on the target sheet of the print job.

Figure 4:
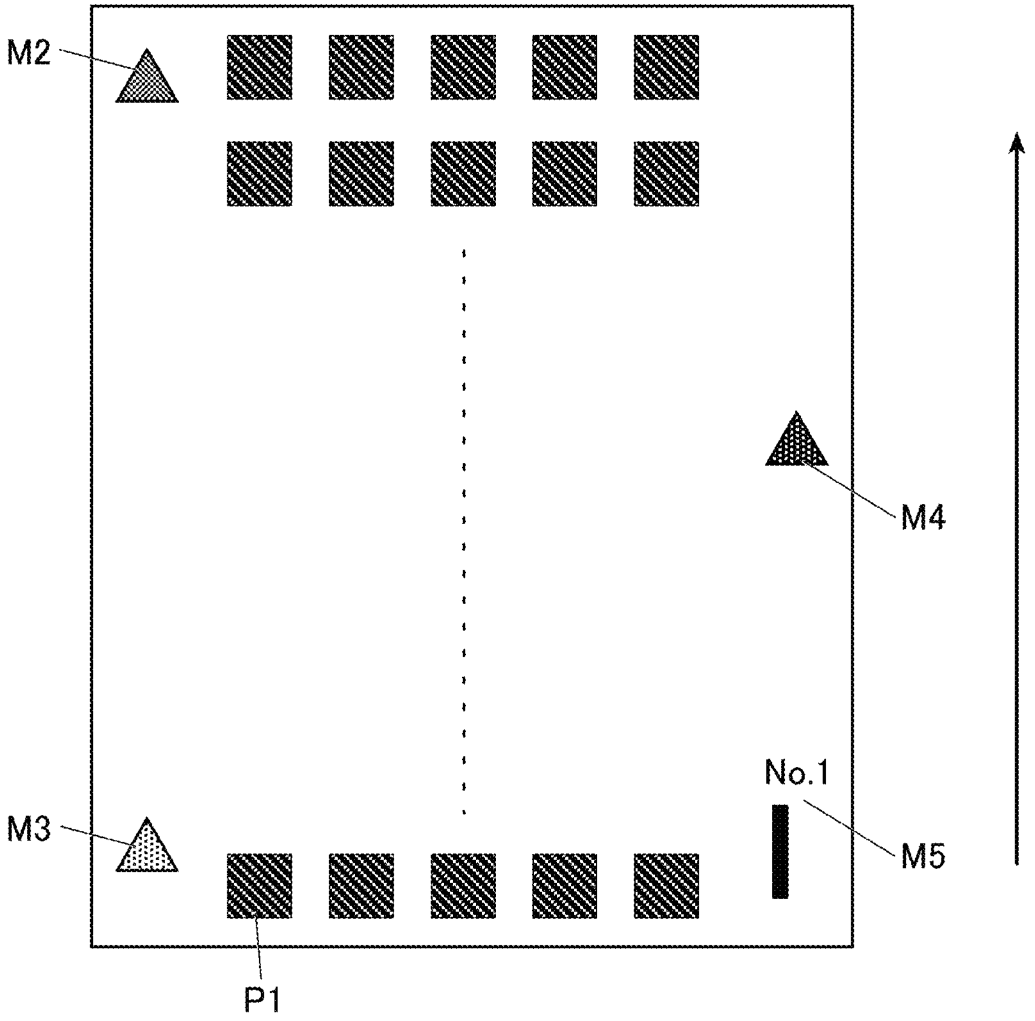
FIG. 4 is a diagram illustrating an example of a single sheet on which an image reading chart is formed.

FIG. 4 illustrates an example of a single sheet on which the image reading chart is formed. In the example illustrated in FIG. 4, the direction of the arrow indicates the sheet conveyance direction.

As shown in FIG. 4, the image reading chart includes a plurality of image reading patches P1.

A mark M2 indicates a leading edge of the sheet. A mark M3 indicates a rear end of the sheet. A mark M4 indicates a front or a back of the sheet in the main scanning direction.

The mark M2, the mark M3, and the mark M4 are used to specify an image reading region. When the image reading chart is read by the image reading device 50, the image forming apparatus 1 can grasp the position where the image reading chart is formed in the sheet. Therefore, in this case, the mark M2, the mark M3, and the mark M4 for identifying the image reading region are unnecessary.

The mark M5 is identification information indicating the ordinal number of a sheet in a case where the image reading chart is formed on a plurality of sheets. In a case where the image reading chart is read by the image reading device 50, the image forming apparatus 1 can grasp the ordinal number of the sheet being read by the image reading device 50. Therefore, in this case, the mark M5 is unnecessary.

FIGS. 5A to 5E illustrate examples of the image reading patch P1. In the example illustrated in FIGS. 5A to 5E, the direction of the arrow indicates the sheet conveyance direction.

Figure 5A:
FIG. 5A is a diagram illustrating an example of an image reading patch.

In the image reading patch P1*a* shown in FIG. 5A, rectangular patterns formed of black at both ends and single toners of yellow, magenta, and cyan therebetween are arranged in a line. The image reading patch P1*a* is a patch for evaluating color misregistration in the sub-scanning direction. The single toner may contain a spot color, for example, "white". Alternatively, the single toner may be, for example, only two colors of magenta and cyan, and black at both ends, or the like, and may be configured by only the number of colors which are easily used for measurement.

Figure 5B:
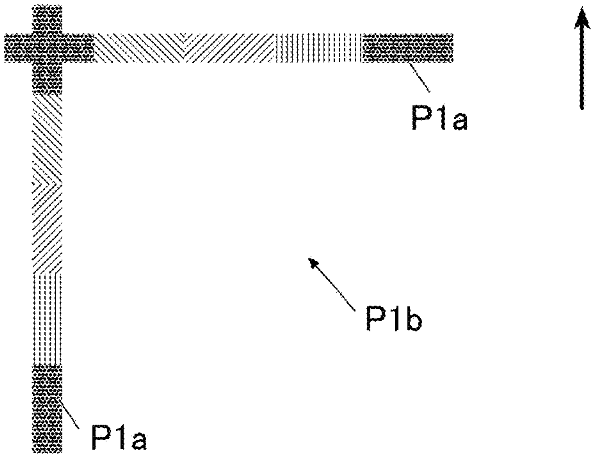
FIG. 5B is a diagram illustrating an example of an image reading patch.

The image reading patch P1*b* illustrated in FIG. 5B includes two image reading patches P1*a* orthogonal to each other. In the image reading patch P1*b*, the two image reading patches P1*a* may overlap each other or may be separated from each other. The image reading patch P1*b* is a patch for evaluating color misregistration in the main scanning direction and the sub-scanning direction.

Figure 5C:
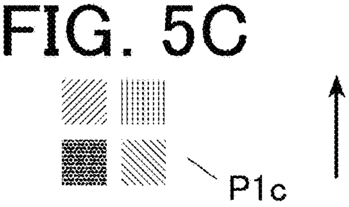
FIG. 5C is a diagram illustrating an example of an image reading patch.

The image reading patch P1*c* illustrated in FIG. 5C includes one rectangular pattern formed of single toner of yellow, magenta, cyan, and black separated from each other. The image reading patch P1*c* is smaller than the image reading patch P1*b* in the main scanning direction and the sub-scanning direction.

Figure 5D:
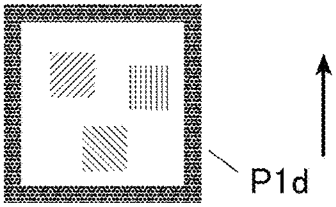
FIG. 5D is a diagram illustrating an example of an image reading patch.

In the image reading patch P1*d* illustrated in FIG. 5D, a rectangular pattern formed with single toners of yellow, magenta, and cyan is arranged in a region surrounded by black.

The image reading patches P1*c* and P1*d* are patches for evaluating color misregistration in the main scanning direction and the sub-scanning direction.

In the image reading patches P1*c* and P1*d*, for example, coordinates of patterns of other colors with respect to a black pattern are measured to measure a color misregistration amount.

Figure 5E:
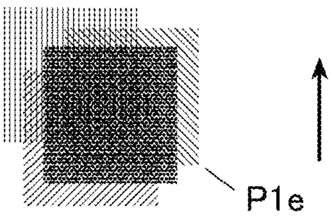
FIG. 5E is a diagram illustrating an example of an image reading patch.

The image reading patch P1*e* illustrated in FIG. 5E includes one each of halftone rectangular patterns formed with single toners of yellow, magenta, cyan, and black. In the original image data of the image reading patch P1*e*, the four patterns overlap each other without deviation. When a color misregistration occurs at the time of forming the image reading patch P1*e*, as shown in FIG. 5E, the four patterns overlap each other while being shifted by a predetermined color misregistration amount. The color misregistration amount is a color misregistration amount in one or both of the main scanning direction and the sub-scanning direction.

Since the image reading patches P1*a*, P1*b*, and P1*c* have high visual recognizability, they may be used as a chart for a user to measure the color misregistration amount by visual observation.

(2-2. Color Information Detection Chart)

A case will be described in which the color misregistration amount of each color in each direction is measured on the basis of a result of detection of the chart by the color information detection device 40, a result of colorimetry by an external colorimeter, or a result of visual measurement by the user. In this case, the main body section 30 forms the color information detection chart on the target sheet of the print job.

Figure 6:
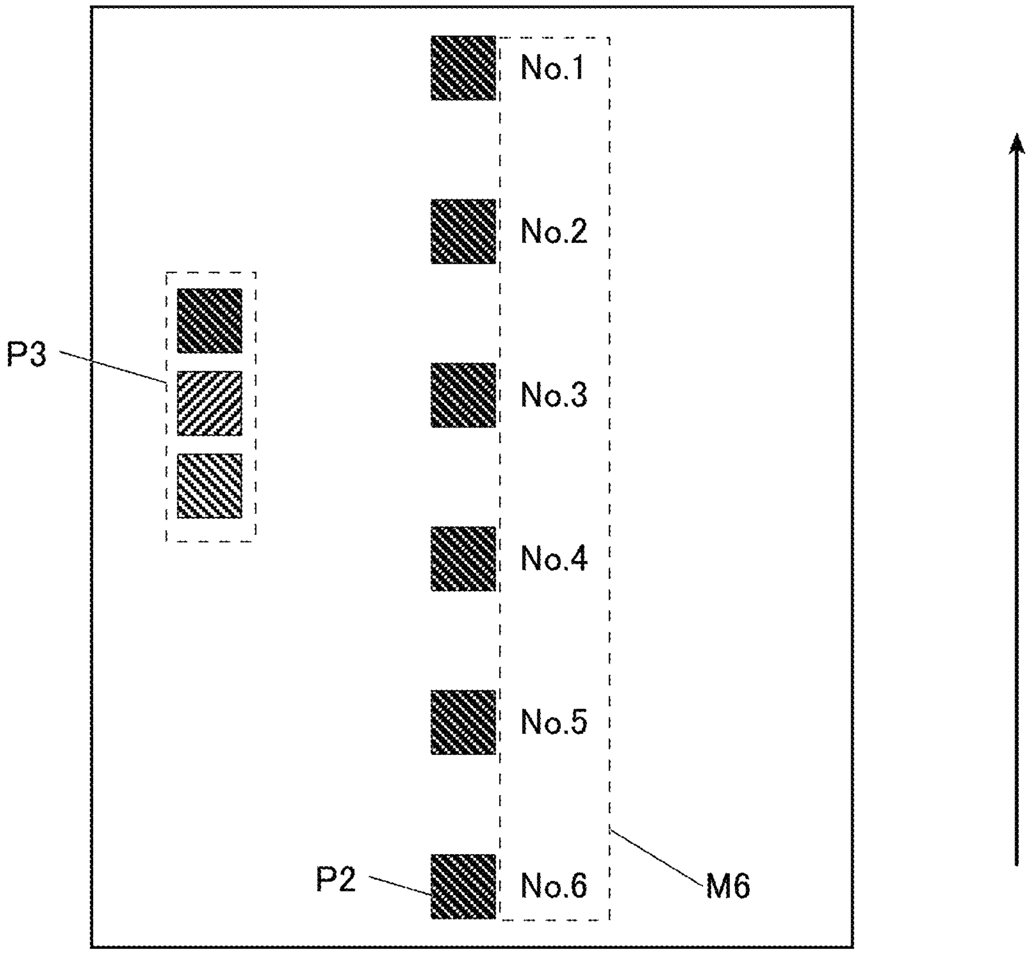
FIG. 6 is a diagram illustrating an example of a single sheet on which a color information detection chart is formed.

FIG. 6 illustrates an example of a single sheet on which a color information detection chart is formed. In the example illustrated in FIG. 6, the direction of the arrow indicates the sheet conveyance direction.

As illustrated in FIG. 6, the color information detection chart includes a plurality of color information detection patches P2.

The mark M6 is identification information indicating the number of each of the plurality of color information detection patch P2 on the sheet. In a case where the color information detection device 40 detects the color information detection chart, the image forming apparatus 1 can grasp the ordinal number of the color information detection patch P2 being detected by the color information detection device 40. Therefore, in this case, the mark M6 is unnecessary.

Figure 7:
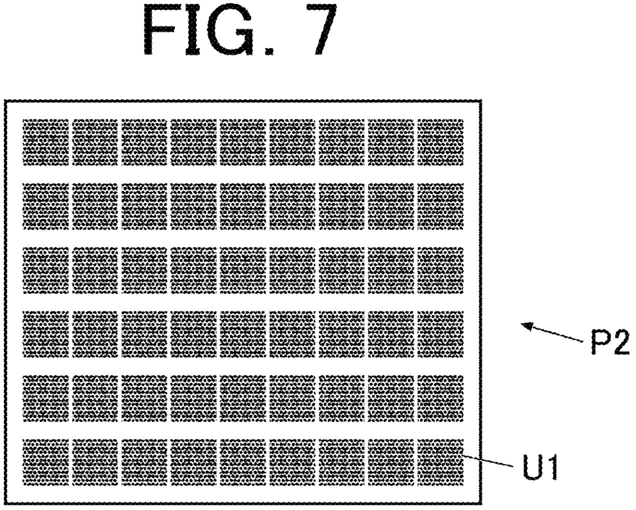
FIG. 7 is a diagram illustrating an example of a unit included in a patch for color information detection.

As illustrated in FIG. 7, the color information detection patch P2 includes a plurality of units U1. The color information detection patch P2 includes, for example, 100 units U1.

The size of the unit U1 is such that a plurality of units U1 are included in the measurement range of the color information detection device 40 or an external colorimeter. The size of the unit U1 is, for example, equal to or smaller than 1 mm.

Figure 8:
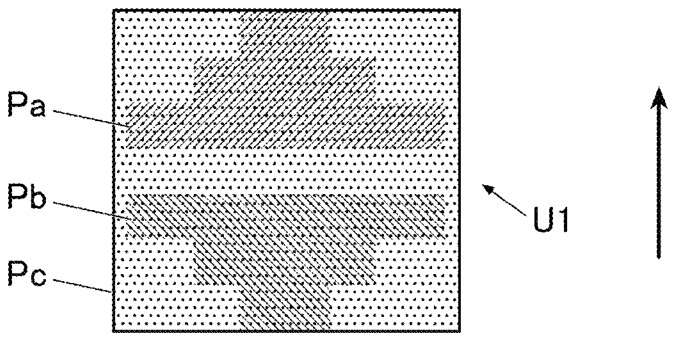
FIG. 8 is a diagram illustrating details of a unit included in the color information detection patch.

FIG. 8 shows the details of the unit U1. In the example illustrated in FIG. 8, the direction of the arrow indicates the sheet conveyance direction.

In the example illustrated in FIG. 8, the unit U1 includes a pattern Pa, a pattern Pb, and a pattern Pc.

The pattern Pa is a pattern formed with magenta toner located on the downstream side in the sheet conveyance direction. The pattern Pa has an upwardly convex shape when the sheet conveyance direction is defined as an upward direction of the sheet surface.

The pattern Pb is a pattern formed with cyan toner located on the upstream side in the sheet conveyance direction. The pattern Pb has a downwardly convex shape when the sheet conveyance direction is defined as an upward direction of the sheet surface.

The pattern Pc is a rectangular pattern formed of black toner, and is superimposed on the pattern Pa and the pattern Pb so as to cover the pattern Pa and the pattern Pb. In the example illustrated in FIG. 8, the pattern Pc is transparently drawn but is not actually transparent, and the pattern Pa and the pattern Pb are invisible.

The color of the pattern Pc is not limited to black and may be white, which is a spot color. The color of the pattern Pc may be a concealing color that can substantially hide other colors.

The colors of the pattern Pa and the pattern Pb are not limited to the example illustrated in FIG. 8. It is sufficient that the colors be two different colors from among yellow, magenta, and cyan.

In the present embodiment, as will be described later, for example, when the formation position of an image formed with magenta toner is shifted in the sheet conveyance direction relative to the formation position of an image formed with black toner, color misregistration can be sensed. That is, in a case where the formation position of the image formed with the magenta toner is shifted in a direction opposite to the sheet conveyance direction with respect to the formation position of the image formed with the black toner, it is not possible to sense the shift. Therefore, the direction of the color misregistration can also be sensed by the color information detection patch P2. However, the color information detection patch P2 cannot sense the color misregistration in the direction opposite to the sheet conveyance direction as described above.

In order to sense the color misregistration in the direction opposite to the sheet conveyance direction, the design of the unit U1 may be reversed with respect to the top and bottom sides of the sheet. A case where the color information detection patch P2 includes the unit U1 illustrated in FIG. 8 in combination with a unit having a configuration vertically inverted from that of the unit on the sheet surface will be described. With the color information detection patch P2 in this case, the direction and magnitude of color misregistration can be sensed in color misregistration in the sheet conveyance direction and in the direction opposite to the sheet conveyance direction.

Figure 9A:
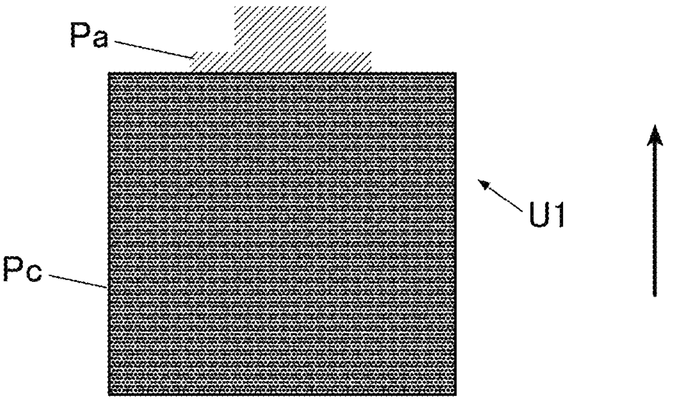
FIG. 9A is a diagram illustrating an example in which a color misregistration occurs in a unit included in a color information detection patch.
Figure 9B:
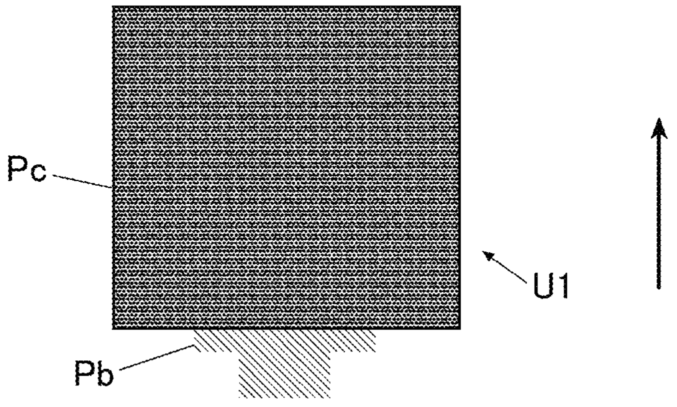
FIG. 9B is a diagram illustrating an example in which color misregistration has occurred in a unit included in a color information detection patch.

FIGS. 9A and 9B illustrate an example in which color misregistration occurs in the unit U1. In the examples illustrated in FIGS. 9A and 9B, the direction of the arrow indicates a sheet conveyance direction.

The example illustrated in FIG. 9A is a case where the formation position of the image formed with the magenta toner is shifted in the sheet conveyance direction. In this case, since part of the pattern Pa is not concealed by the pattern Pc, the color information detection patch P2 appears to have a color in which black and magenta are mixed when visually observed. Alternatively, when the color information detection patch P2 in this case is detected by the color information detection device 40, a color in which black and magenta are mixed is detected. Alternatively, when the color information detection patch P2 in this case is subjected to colorimetry by the external colorimeter, a color in which black and magenta are mixed is measured.

As the color misregistration amount in the sheet conveyance direction at the formation position of the image formed with the magenta toner becomes larger, the color of the color information detection patch P2 becomes closer to magenta.

The example illustrated in FIG. 9B is a case where the formation position of the image formed with the cyan toner is shifted in a direction opposite to the sheet conveyance direction. In this case, since part of the pattern Pb is not concealed by the pattern Pc, the color information detection patch P2 appears to have a color in which black and cyan are mixed when visually observed. Alternatively, when the color information detection patch P2 in this case is detected by the color information detection device 40, a color in which black and cyan are mixed is detected. Alternatively, when the color information detection patch P2 in this case is subjected to colorimetry by the external colorimeter, a color in which black and cyan are mixed is measured.

As the color misregistration amount in the direction opposite to the sheet conveyance direction at the formation position of the image formed with the cyan toner becomes larger, the color of the color information detection patch P2 becomes closer to cyan.

The color information detection chart is a chart for correcting color misregistration formed by the image forming section 34 which forms images in a plurality of colors on a sheet by an intermediate transfer method. The color information detection chart includes a first pattern (pattern Pc) formed in a first color (black) among a plurality of colors, and a second pattern (e.g., pattern Pa) formed in a second color (e.g., magenta) that is a chromatic color among the plurality of colors. In the color information detection chart, a plurality of the first patterns and a plurality of the second patterns are formed such that the first patterns cover the second patterns. In the color information detection chart, the second pattern is located upstream or downstream from the center of the first pattern in the sheet conveyance direction.

Figure 10A:
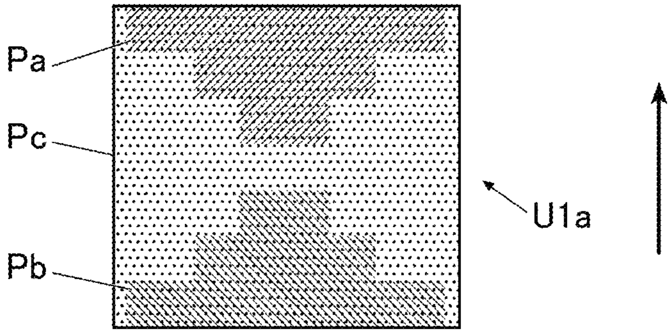
FIG. 10A is a diagram illustrating another example of the unit included in the color information detection patch.
Figure 10B:
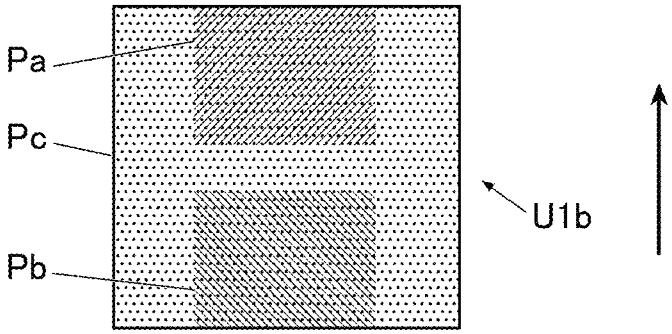
FIG. 10B is a diagram illustrating another example of the unit included in the color information detection patch.

FIG. 10A and FIG. 10B illustrate another example of the unit U1 illustrated in FIG. 8. In the example illustrated in FIGS. 10A and 10B, the direction of the arrow indicates the sheet conveyance direction.

In the unit U1*a* illustrated in FIG. 10A, the pattern Pa has a downwardly convex shape when the sheet conveyance direction is defined as the upward direction of the sheet surface. The pattern Pb has an upwardly convex shape when the sheet conveyance direction is defined as an upward direction of the sheet surface.

In the unit U1*b* shown in FIG. 10B, the pattern Pa and the pattern Pb are rectangular.

Figure 11:
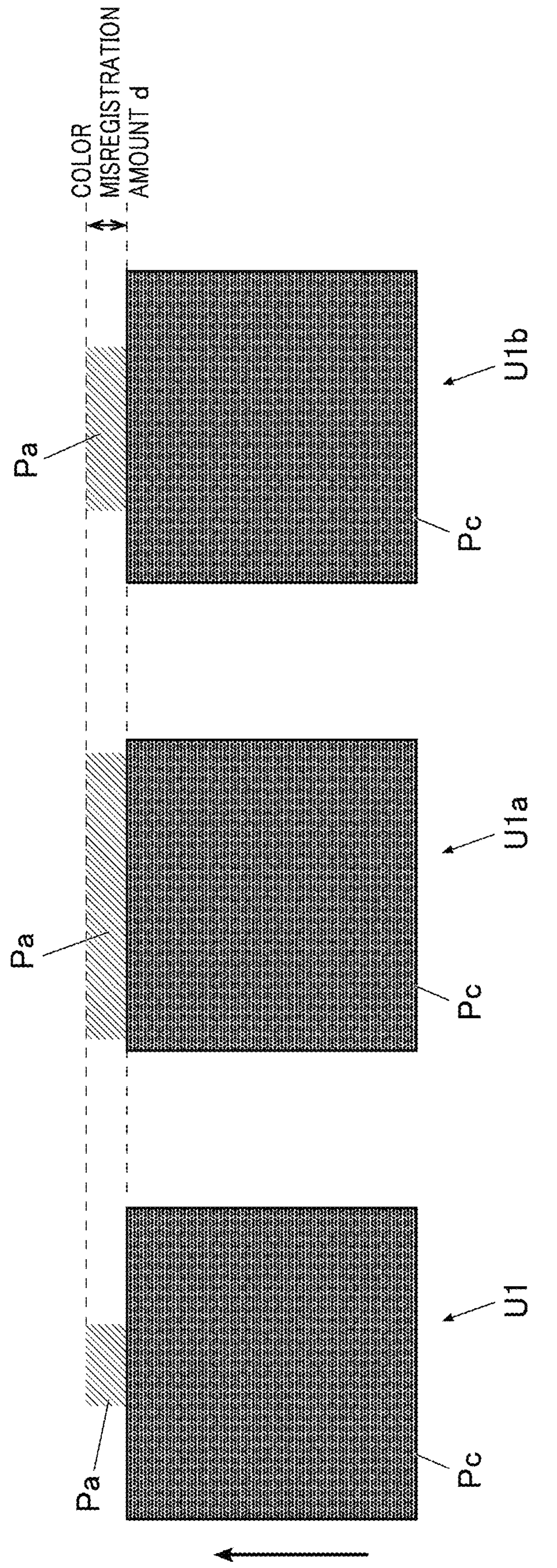
FIG. 11 is a diagram illustrating an example in which color misregistration has occurred in a unit included in the color information detection patch.

FIG. 11 illustrates a case where the formation positions of the images formed with the magenta toner are shifted by a color misregistration amount d in the sheet conveyance direction in the units U1, U1*a*, and U1*b*. In this case, the unit U1*a* has a greater amount of protrusion, which is the area of the pattern Pa protruding from the pattern Pc, than the unit U1. Therefore, the color of the color information detection patch P2 having the unit U1*a* is closer to magenta than the color of the color information detection patch P2 having the unit U1.

The amount of protrusion of the pattern Pa from the pattern Pc during image formation depends on the characteristics of the image forming process. Therefore, it is preferable to select the units U1, U1*a*, and U1*b* in accordance with the magnitude of the amount of color misregistration that may occur during image formation, the amount of change in the color of the color information detection patch P2 due to color misregistration, and the characteristics of the image forming process such that the change in color is easy to see.

For example, in a case where an image can be formed according to a pattern of a bitmap image (original image) without bleeding and blurring of drawing in the image forming process, it is preferable to select a simple pattern such as the unit U1*b*.

The measurement sensitivity when the color misregistration amount is measured using the color information detection patch P2 is due to the following. To be more specific, the above is due to the amount of protrusion of the pattern Pa, which protrudes due to the color misregistration amount d with relation to the pattern Pc, and the density of the unit U1 per unit area in the color information detection patch P2.

Therefore, in order to increase the measurement sensitivity, the unit U1 is made smaller and the unit U1 is arranged more densely.

However, when a relatively large color misregistration amount occurs during image formation, the color tone change amount of the color information detection patch P2 with respect to the color misregistration amount is saturated, and the color misregistration amount cannot be accurately measured in some cases. An example of this case is illustrated in FIG. 12.

Figure 12:
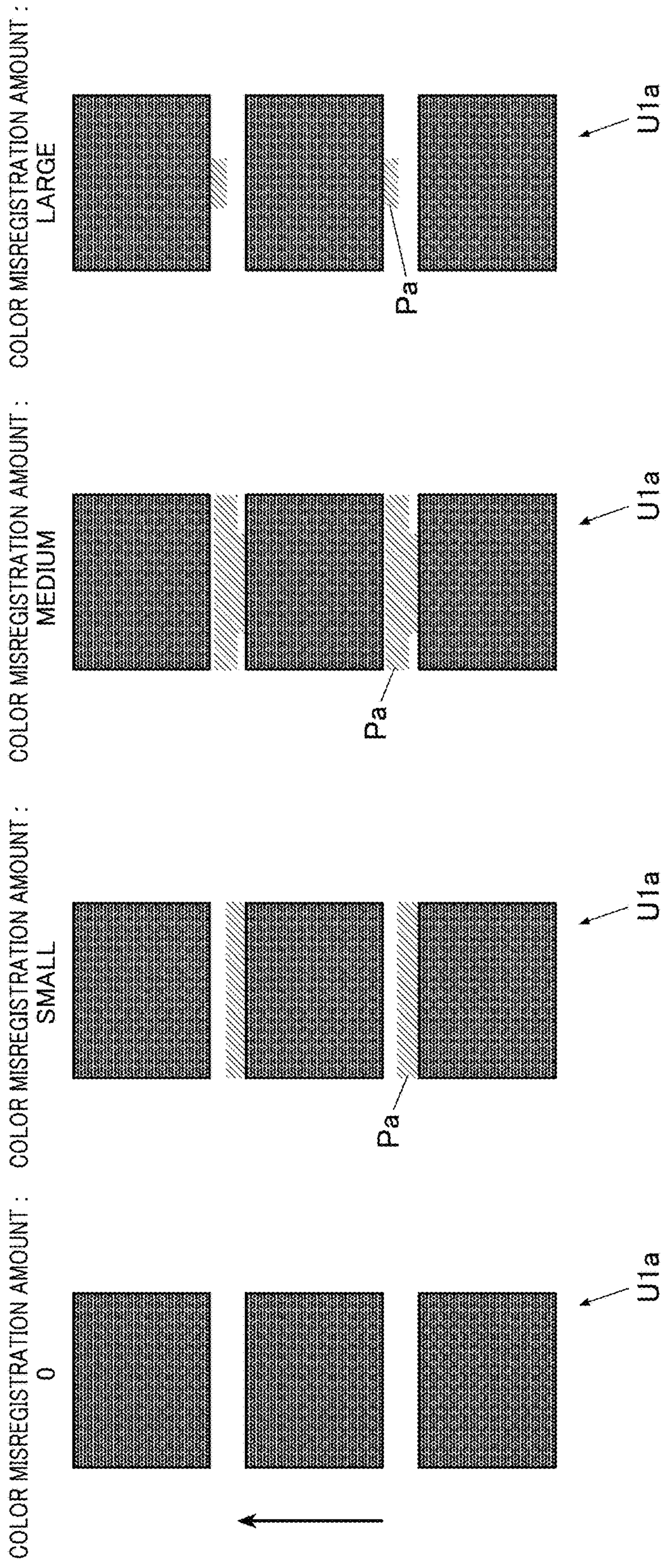
FIG. 12 is a diagram illustrating a case where formation positions of images formed in the units included in the color information detection patches are shifted by color misregistration amounts of 0, small, medium, and large in the sheet conveyance direction.

FIG. 12 illustrates a case where the formation position of the image formed with the magenta toner is shifted in the sheet conveyance direction by the color misregistration amount of 0, small, medium, and large in the unit U1*a*. In the example illustrated in FIG. 12, the direction of the arrow indicates the sheet conveyance direction.

In the example shown in FIG. 12, when the color misregistration amount is 0, small, or medium, the protrusion amount of the pattern Pa with respect to the pattern Pc corresponds to the color misregistration amount. However, the amount of protrusion of the pattern Pa relative to the pattern Pc is smaller and the color tone change amount is smaller in a case where the amount of color misregistration is large than in a case where the amount of color misregistration is medium. This is a state where the pattern Pa intrudes into the pattern Pc of the adjacent unit U1*a*.

Therefore, it is preferable that the measurement sensitivity in the case of measuring the color misregistration amount using the color information detection patch P2 is set according to the following. Specifically, it is the maximum color misregistration amount assumed due to the sheet on which the chart is formed and the characteristic of the image forming process for forming the chart.

Referring back to FIG. 6, the reference patch P3 is a patch for color tone comparison for determining the color misregistration amount of each color in the sheet conveyance direction or the direction opposite to the sheet conveyance direction at the color information detection patch P2. The reference patch P3 may be a color patch that simulates only the color tone in a case where color misregistration occurs in the color information detection patch P2. Alternatively, the reference patch P3 may be a patch formed in a pattern that simulates the amount of protrusion of a chromatic color when a color misregistration occurs in the color information detection patch P2. The chromatic color is yellow, magenta, or cyan.

No reference patch P3 may be formed when the color misregistration amount in each direction of each color is measured based on a result of detection of the chart by the color information detection device 40 or a result of colorimetry by the external colorimeter.

Figure 13:
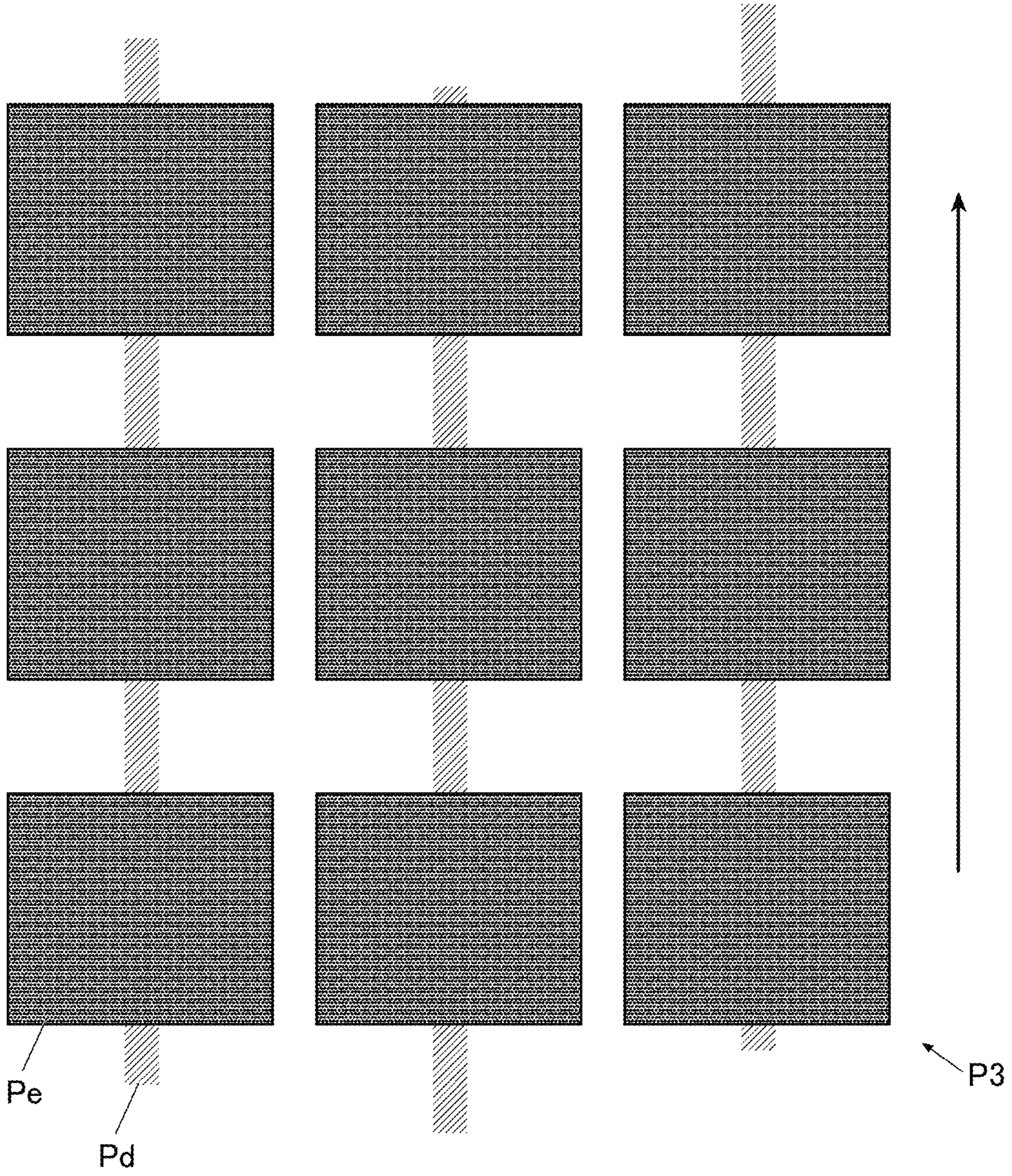
FIG. 13 is a diagram illustrating an example of a reference patch formed with a pattern that simulates the amount of protrusion of a chromatic color in a case where color misregistration occurs in a color information detection patch.

FIG. 13 illustrates an example of the reference patch P3 formed in a pattern that imitates the amount of protrusion of a chromatic color when color misregistration occurs in the color information detection patch P2. In the example illustrated in FIG. 13, the direction of the arrow indicates the sheet conveyance direction.

In the example illustrated in FIG. 13, the reference patch P3 includes a plurality of line-shaped patterns Pd formed of magenta toner. The pattern Pd is arranged such that the sheet conveyance direction and the longitudinal direction are parallel to each other. The reference patch P3 includes a plurality of rectangular patterns Pe formed of black toner to cover a portion of the pattern Pd.

Even when the color misregistration occurs in the reference patch P3, the protrusion amount of the pattern Pd with respect to the pattern Pe is constant. Thus, the reference patch P3 can stably reproduce a color tone in a case where color misregistration occurs in the color information detection patch P2.

When forming the color information detection chart on the target sheet of the print job, the third controller 36 may form the marks M2 to M5 illustrated in FIG. 4 on the target sheet.

In this case, the mark M2, the mark M3, and the mark M4 are used to identify the formation region of the color information detection chart.

In a case where the color information detection chart is detected by the color information detection device 40, the image forming apparatus 1 can grasp a position in the sheet where the color information detection chart is formed. Therefore, in this case, the mark M2, the mark M3, and the mark M4 for identifying the formation region of the color information detection chart are unnecessary.

In a case where the color information detection chart is detected by the color information detection device 40, the image forming apparatus 1 can grasp the ordinal number of the sheet being detected by the color information detection device 40. Therefore, in this case, the mark M5 is unnecessary.

That is, the third controller 36 as a second determiner which will be described later determines the following.

To be specific, when the measurement method determined by the first determining section which will be described later is a method using an image reading device other than in-line (the image reading unit 33 or an external scanner), a method using a colorimeter other than in-line, or a method by user's visual inspection, the chart includes information (marks M1 to M5) indicating at least one of the orientation of the chart, identification information of the sheet, and a reading region in the sheet.

3. Operation of Image Forming Apparatus

Next, a pre-job control process executed before the image forming apparatus 1 executes a print job will be described.

The third controller 36 cooperates with the program stored in the storage section 37 to execute pre-job control processing.

The third controller 36 executes the pre-job control process, for example, when the main body section 30 receives job information of a print job from an external device or the like via the communication section 38. The external device is, for example, a personal computer.

Figure 14:
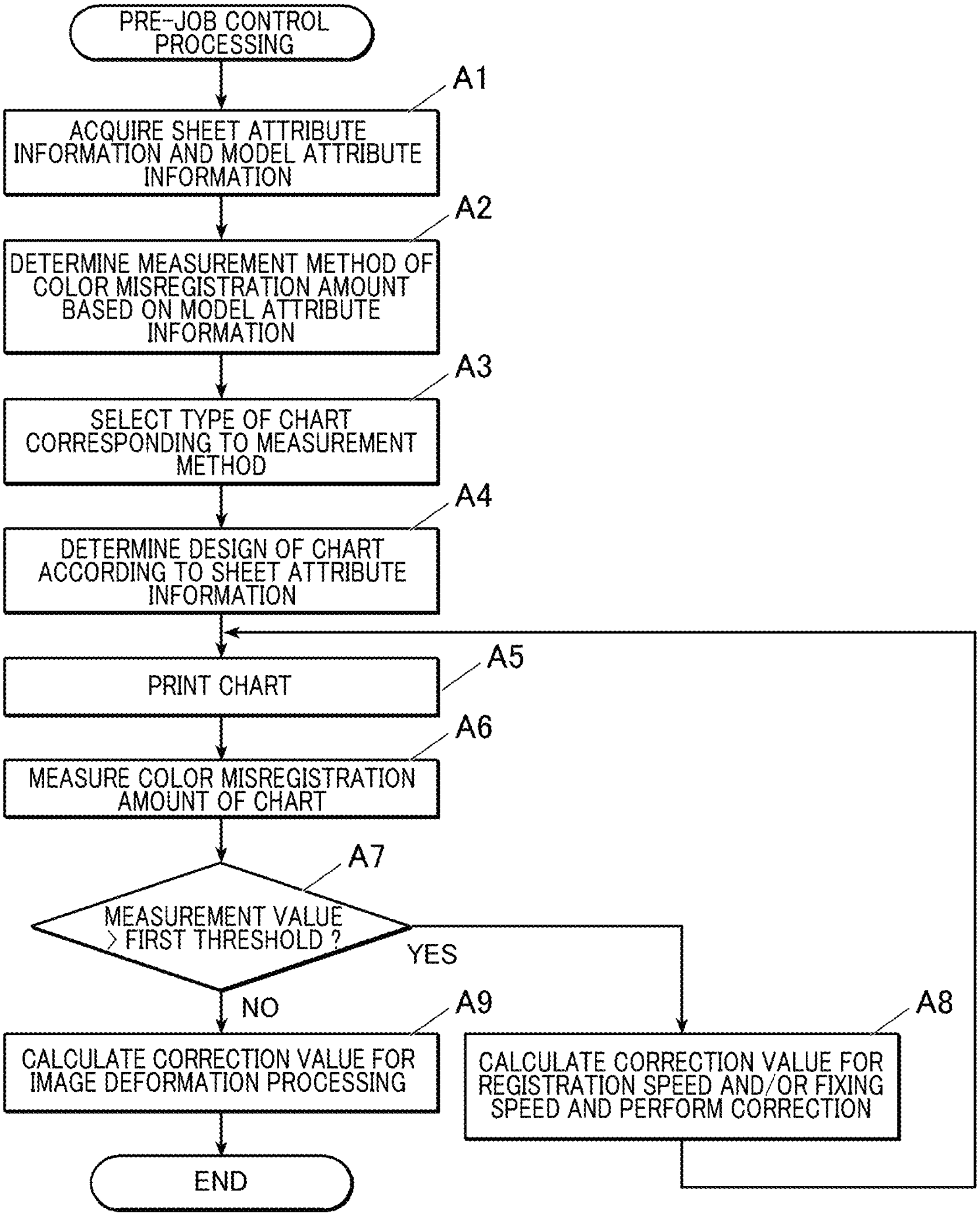
FIG. 14 is a flowchart illustrating a flow of pre-job control processing.

FIG. 14 shows a flowchart of the pre-job control process.

(3-1. Pre-Job Control Processing)

The third controller 36 acquires sheet attribute information and model attribute information (step A1).

That is, the third controller 36 acquires sheet attribute information indicating the attribute of the sheet. The third controller 36 functions as an acquiring section.

The sheet attribute information includes the basis weight, size, paper type, physical property values, and the like of the target sheet of the print job.

The third controller 36 acquires, for example, the basis weight, the size, and the paper type of the target sheet from information associated with the sheet feed trays 131 to 133.

The third controller 36 acquires the physical property value of the target sheet, for example, by sensing the target sheet with the sensing device 20.

That is, the third controller 36 as an acquiring section acquires, as the sheet attribute information, the physical property value of the sheet sensed by the sensing section 22.

The model attribute information is information such as whether the image forming apparatus 1 includes the color information detection device 40 and/or the image reading device 50.

Next, the third controller 36 determines, based on the model attribute information acquired in step A1, a method of measuring the amount of color misregistration in a chart to be formed on the target sheet (step A2).

That is, the third controller 36 determines a measurement method for measuring the color misregistration amount at a predetermined position in the sheet surface on which the image is formed by the image forming section 34. The third controller 36 functions as a first determination section.

Specifically, a case where the image forming apparatus 1 includes the color information detection device 40 will be described. In this case, the third controller 36 determines to detect the color information of the chart formed on the target sheet by the color information detection device 40 and to measure the color misregistration amount based on the detection result.

Alternatively, a case where the image forming apparatus 1 includes the image reading device 50 will be described. In this case, the third controller 36 determines to read the chart formed on the target sheet by the image reading device 50 and to measure the color misregistration amount based on the reading result.

A case where the image forming apparatus 1 includes both the color information detection device 40 and the image reading device 50 will be described. In this case, it may be possible for the user to select whether color information is to be detected from the chart formed on the target sheet by the color information detection device 40 or to be read by the image reading device 50. In this case, the third controller 36 displays options on the display part 32, and receives a selection input from the user via the operation part 31. At this time, the third controller 36 may cause the display part 32 to display options to be recommended based on the degree of automation, the accuracy, and the like of each option.

Alternatively, the third controller 36 may use the selection made by the user when the pre-job control processing was executed last time.

A case where the image forming apparatus 1 is not provided with both the color information detection device 40 and the image reading device 50 will be described. In this case, it may be possible for a user to select whether to perform colorimetry on the chart formed on the target sheet with the external colorimeter, to measure the color misregistration amount by user's visual inspection, to read with the image reading unit 33, or to read with the external scanner. In this case, the third controller 36 displays options on the display part 32, and receives a selection input from the user via the operation part 31. At this time, the third controller 36 may cause the display part 32 to display options to be recommended based on the degree of automation, the accuracy, and the like of each option.

Alternatively, the third controller 36 may use the selection made by the user when the pre-job control processing was executed last time.

That is, in the present invention, the color misregistration amount can be measured even in a configuration in which the image forming apparatus 1 does not include the color information detection device 40 and the image reading device 50.

As described above, the third controller 36 receives the user's selection of a measurement method. The third controller 36 functions as a reception section.

The third controller 36 as the reception section displays options for the measurement method on the display part 32 on the basis of the configuration of the image forming apparatus, and receives a selection from the options.

The measurement method is a method using the in-line image reading device 50, a method using an image reading device other than the in-line image reading device (the document reading unit 33 or an external scanner), a method using the in-line color information detection device 40, a method using a colorimeter other than the in-line colorimeter, or a visual method by a user.

In step A2, the third controller 36 may restrict user's selection of a measurement method on the basis of the sheet attribute information acquired in step A1.

For example, a case where the stiffness of the target sheet is so high that the target sheet cannot be read by the ADF of the image reading unit 33 will be described. In this case, when displaying the measurement method options on the display part 32, the third controller 36 does not display that reading is to be performed using the ADF of the image reading unit 33.

That is, the third controller 36 serving as the first determining section restricts the user's selection of the measurement method based on the sheet attribute information acquired as the acquiring section.

Next, the third controller 36 selects a type of chart corresponding to the measurement method determined in step A2 (step A3).

Specifically, the third controller 36 selects the color information detection chart in the following cases. Specifically, there are a case where color information is detected from a chart formed on a target sheet by the color information detection device 40, a case where colorimetry is performed by an external colorimeter, and a case where a color misregistration amount is measured by visual inspection of the user.

When the chart formed on the target sheet is read by the image reading device 50, the image reading unit 33, or an external scanner, the third controller 36 selects the image reading chart.

Next, the third controller 36 determines the design of the chart of the type selected in step A3, based on the sheet attribute information acquired in step A1 (step A4).

That is, the third controller 36 determines, as the first determining section, the content of the chart for correcting at least the color misregistration on the surface of the sheet, based on the determined measurement method. The third controller 36 functions as a second determination section.

The third controller 36 serving as the second determination section determines the content of the chart based on the sheet attribute information acquired as the acquiring section.

Specifically, the third controller 36 determines the number of patches included in the chart, the arrangement positions of the patches, the shape of the pattern corresponding to the maximum color misregistration amount assumed from the sheet attribute information, and the like.

Next, the third controller 36 controls the image forming section 34 to form the chart of which the design is determined in step A4 on the target sheet (step A5).

When forming the chart on the target sheet in step A5, the third controller 36 forms the chart on the target sheet based on the setting information of the print job.

The setting information of the print job includes, for example, information indicating whether to perform single-sided printing or double-sided printing, and in the case of single-sided printing, whether to print on the front side or the back side.

The setting information of the print job includes, for example, information indicating the number of sheets to be printed.

The setting information of the print job includes, for example, information indicating that printing is performed only on a specific sheet during continuous sheet passing.

The third controller 36 preferably forms a chart under the same or similar setting as the setting information of the print job.

Next, the third controller 36 measures the color misregistration amount in the chart formed in step A5 by the measurement method determined in step A2 (step A6).

That is, the third controller 36 measures the color misregistration amount at a predetermined position in the surface of the sheet on which the image is formed by the image forming section 34. The third controller 36 functions as a measurement section.

Figure 15:
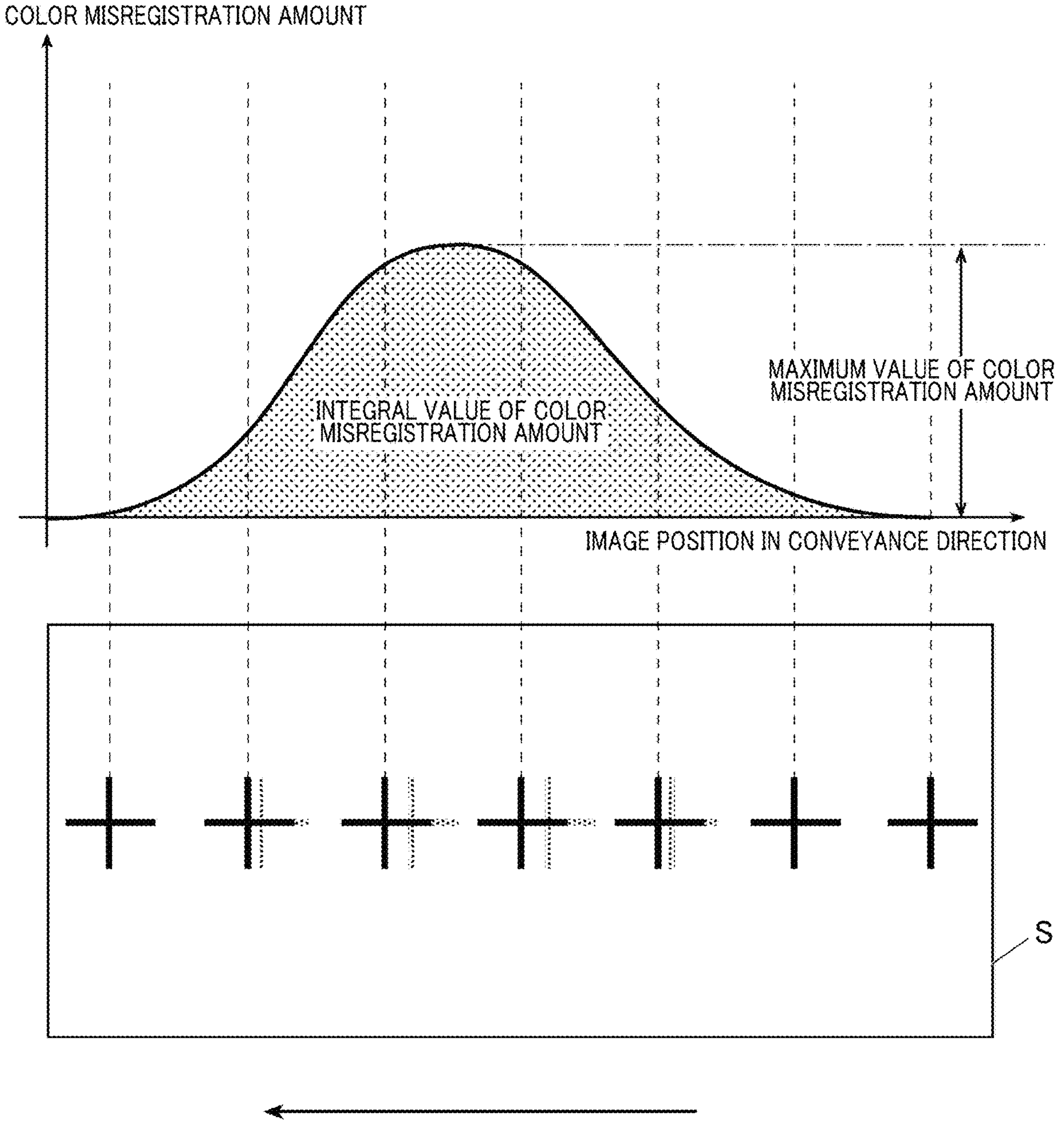
FIG. 15 is a diagram illustrating an example of a measurement value of a color misregistration amount.

FIG. 15 illustrates an example of the color misregistration amount measured in step A6. In the example illustrated in FIG. 15, the direction of the arrow indicates the sheet conveyance direction.

In the example illustrated in FIG. 15, the chart includes a plurality of cross patterns formed in the central portion of the sheet in the main scanning direction.

The positions at which the charts are formed are not limited to the example illustrated in FIG. 15. The third controller 36 may form the patterns at a plurality of positions in the main scanning direction. The third controller 36 may form the chart at a position in the main scanning direction corresponding to the sheet attribute information, the detectable range of the color information detection device 40, or the readable range of the image reading device 50.

The position where the chart is formed is a predetermined position in the surface of the sheet where the color misregistration amount is measured.

That is, the predetermined position is a position based on the sheet attribute information and/or the measurement method.

In the example illustrated in FIG. 15, the third controller 36 forms the chart with two color toners, but the present invention is not limited thereto. The third controller 36 may form the chart with three or more colors of toner.

In step A6, the third controller 36 measures, as the color misregistration amount, an integral value, an average value, a maximum value, a median value, a mode value, or the like of the color misregistration amounts among the respective colors.

That is, the third controller 36 as the measurement section measures an integral value of the color misregistration amounts among the plurality of colors as the color misregistration amount.

The third controller 36 as the measurement section measures the maximum value of the color misregistration amounts among the plurality of colors as the color misregistration amount.

Next, the third controller 36 determines whether the color misregistration amount measured in step A6 is greater than a predetermined first threshold (step A7). The predetermined first threshold is set in advance. A case where the measured amount of color misregistration is larger than the first threshold (step A7; YES) will be described. In this case, the third controller 36 calculates and adjusts an adjustment value (correction value) for the registration speed and/or the fixing speed in the image forming process of the main body section 30 (step A8).

The registration speed is a conveyance speed of the sheet in the registration section 346.

The fixing speed is a conveying speed of the sheet in the fixing section 344.

In step A8, the third controller 36 adjusts the registration speed and/or the fixing speed so that the color misregistration amount measured in step A6 is equal to or less than a predetermined first threshold.

Next, the third controller 36 proceeds to step A5 of the present process.

In step A8, the third controller 36 calculates an adjustment amount in the registration speed and/or the fixing speed based on the sheet attribute information acquired in step A1 and the color misregistration amount measured in step A6.

The third controller 36 calculates an adjustment amount Vr1 of the registration speed in a case where the basis weight of the target sheet is 200 to 350 gsm by the following formula (1).

$$Vr1(\%) = Ar1 * (X * T1 * W) \tag{1}$$

The third controller 36 calculates an adjustment amount VF1 of the fixing speed in a case where the basis weight of the target sheet is 200 to 350 gsm by the following formula (2).

$$VF1(\%) = AF1 * (X * T1 * W) \tag{2}$$

The third controller 36 calculates an adjustment amount Vr2 of the registration speed in a case where the basis weight of the target sheet is larger than 350 gsm, by the following formula (3).

$$Vr2(\%) = Ar2 * (X * T2 * W) \tag{3}$$

The third controller 36 calculates an adjustment amount VF2 of the fixing speed in a case where the basis weight of the target sheet is larger than 350 gsm, by the following formula (4).

$$VF2(\%) = AF2 * (X * T2 * W) \tag{4}$$

In the above formula, the basis weight of the target sheet is the sheet attribute information acquired in step A1.

Ar1, AF1, Ar2, and AF2 are constants for unit conversion. Ar1 and Ar2 may be the same value or may be different values. AF1 and AF2 may be the same value or may be different values.

X is the amount of color misregistration measured in step A6.

T1 and T2 are the basis weight of the target sheet.

W is a width of the target sheet in the main scanning direction.

In the above formulas (1) to (4), the basis weight of the target sheet is classified into the case where the basis weight is 200 to 350 gsm and the case where the basis weight is more than 350 gsm, but the classification of the basis weight is not limited thereto.

In step A8, the third controller 36 may calculate the adjustment amount (s) in the registration speed and/or the fixing speed based on a table storing constants for unit conversion for each paper type of sheet or each width of sheet in the main scanning direction.

In this case, for example, the third controller 36 calculates, by the following formula (5), an adjustment amount Vr3 of the registration speed in a case where the basis weight of the target sheet is 200 to 250 gsm and the length in the main scanning direction is 297 mm. The third controller 36 calculates an adjustment amount VF3 of the fixing speed in this case by the following formula (6).

$$Vr3\,(\%) = Ar3 * X \quad (5)$$

$$VF3(\%) = AF3 * X \quad (6)$$

In this case, for example, the third controller 36 calculates, by the following formula (7), an adjustment amount Vr4 of the registration speed in a case where the basis weight of the target sheet is 251 to 300 gsm and the length in the main scanning direction is 297 mm. The third controller 36 calculates an adjustment amount VF4 of the fixing speed in this case by the following formula (8).

$$Vr4\,(\%) = Ar4 * X \quad (7)$$

$$VF4(\%) = AF4 * X \quad (8)$$

Ar3, AF3, Ar4, and AF4 are constants for unit conversion. The values Ar3 and Ar4 may be the same value or different values. The values AF3 and AF4 may be the same value or different values.

Figures 16, 17:
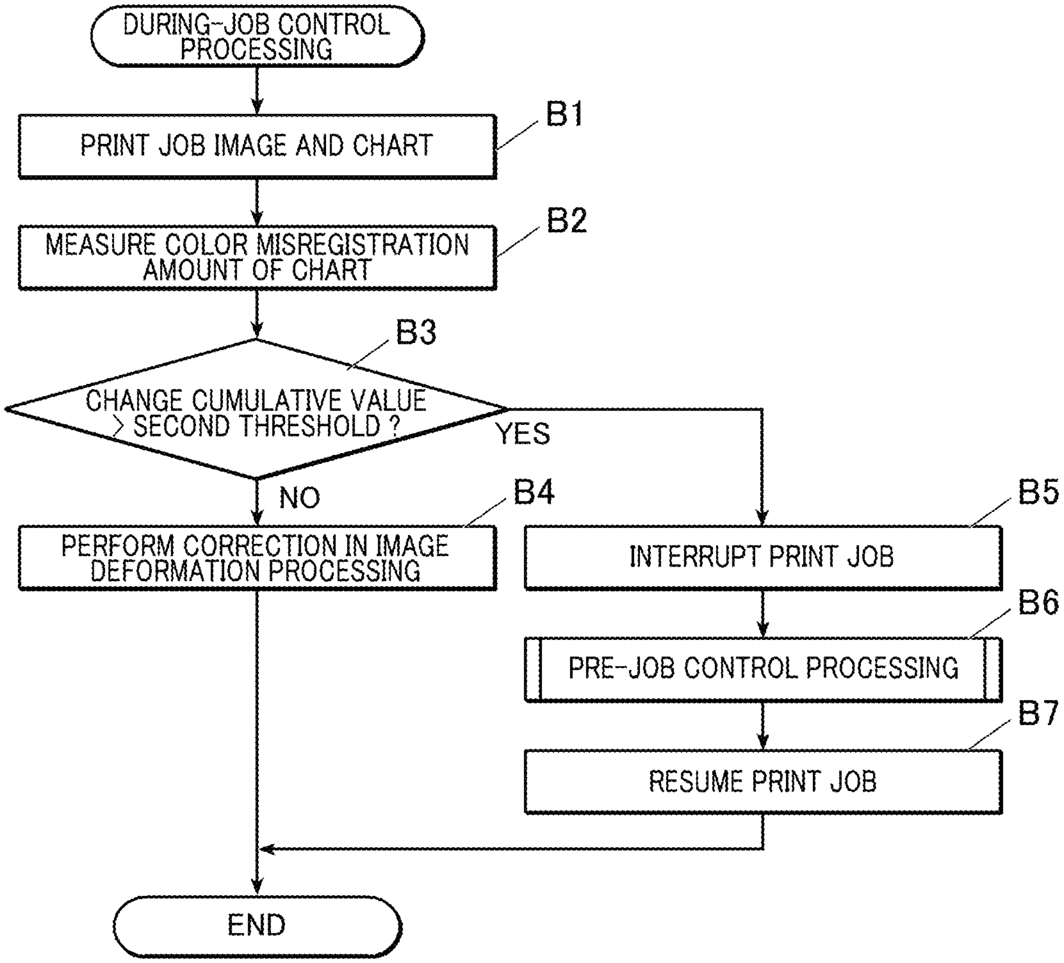
FIG. 16 is a diagram illustrating an example of adjustment amounts for a registration speed and a fixing speed.
FIG. 17 is a flowchart illustrating a flow of a during-job control processing.

FIG. 16 illustrates an example of adjustment amounts for the registration speed and the fixing speed.

As shown in FIG. 16, the adjustment amount may be a single value such as 0%, or a value in a predetermined range such as 0.2 to 0.3%. When the adjustment amount is a value within a predetermined range, the third controller 36 sets the adjustment amount as a target value in the case of repeating acceleration/deceleration control of the registration speed and the fixing speed so that the adjustment value falls within this range.

On the other hand, a case where the measured color misregistration amount is equal to or smaller than the first threshold (step A7; NO) will be described. In this case, the third controller 36 calculates the correction value for image deformation processing on the basis of the sheet attribute information acquired in step A1 (step A9), and ends the present processing.

In step A9, the third controller 36 calculates a correction value in the image deformation processing so that the measured color misregistration amount becomes zero.

During execution of the print job, the third controller 36 performs image deformation processing on the job image using the correction value calculated in step A9. Next, the third controller 36 forms the job image after the image deformation processing on the target sheet.

As the image deformation processing, a known method can be used.

For example, the third controller 36 defines a grid-like mesh on the job image, and determines a direction in which the color misregistration is locally canceled in the position change amount of each intersection of the mesh. Next, the third controller 36 sets the position change amount of each mesh as each coordinate change amount, expresses the deformation of the unit mesh (rectangle) by affine transformation or projective transformation, and performs deformation processing.

Since the local deformation processing deals with a large amount of image information, the third controller 36 may use, for example, existing image deformation processing incorporated in an ASIC or the like used for image processing.

That is, the third controller 36 performs control for correcting at least the color misregistration on the surface of the sheet on the basis of the sheet attribute information acquired as the acquiring section and the color misregistration amount measured as the measurement section. The third controller 36 functions as a controller.

The control for correcting at least the color misregistration in the sheet surface includes calculating and adjusting (correcting) the adjustment value (correction value) in the registration speed and/or the fixing speed in step A8.

That is, the third controller 36 as the controller adjusts the conveyance speed (registration speed) in the registration section 346 and/or the conveyance speed (fixing speed) in the fixing section 344 to correct the color misregistration.

The control for correcting at least the color misregistration in the sheet surface includes performing the image deformation processing of the job image by the correction value calculated in step A9.

That is, the third controller 36 as a controller performs image deformation processing for correcting color misregistration.

In step A5 for the second time after performing step A8, the third controller 36 may adjust the design of the chart determined in step A4 so as to be able to measure an assumed color misregistration amount and obtain an appropriate measurement sensitivity.

To be specific, the third controller 36 forms a chart such that the color tone change amount is not saturated in step A5 performed for the first time.

The third controller 36 adjusts the design of the chart formed in step A5 for the first time so that more detailed measurement can be performed in step A5 for the second time. Next, the third controller 36 forms the adjusted chart on the target sheet. For example, the third controller 36 reduces the size of the entire chart formed in step A5 for the first time. Thus, the measurement sensitivity can be increased.

After performing step A5 for the second time, the third controller 36 measures the color misregistration amount of the chart formed in step A5 for the second time by the measurement method determined in step A2 (step A6).

That is, the third controller 36 as the measurement section measures the color misregistration amount after the adjustment of the conveyance speed (registration speed) in the registration section 346 and/or the conveyance speed (fixing speed) in the fixing section 344.

In a case where the color misregistration amount measured in step A6 for the second time is equal to or less than the first threshold (step A7; NO), the third controller 36 calculates the correction value in the image deformation processing based on the sheet attribute information acquired in step A1 (step A9), and ends the present processing.

That is, the third controller 36 as the controller corrects, by the image deformation processing, the color misregistration amount after the adjustment of the conveyance speed (registration speed) in the registration section 346 and/or the conveyance speed (fixing speed) in the fixing section 344.

Next, for example, a case where the setting information of the print job indicates double-sided printing or multiplesheet printing will be described. In this case, the third controller 36 may determine, in step A4 of the pre-job control processing, the content of the chart corresponding to each case. Next, the third controller 36 executes step A4 to step A9 in each case.

In the above-described pre-job control processing, the third controller 36 may execute step A9 after step A6 without executing step A7.

However, if the color misregistration amount larger than the predetermined first threshold is to be corrected by the correction value of the image deformation processing calculated in step A9, the correction value is too large, and the following problem occurs. Specifically, it is a state where an adjustment margin in the image deformation processing is insufficient, a correction effect due to fluctuation of the color misregistration amount is not stable, or the like.

In the pre-job control process, when the measured color misregistration amount is equal to or less than the first threshold (step A7; NO), the third controller 36 may end this process without executing step A9.

A case will be described in which the third controller 36 has stored, in the storage section 37, the correction value calculated by executing the pre-job control processing in the past with respect to a sheet having an attribute close to the sheet attribute indicated by the sheet attribute information acquired in step A1 as the target sheet.

That is, the storage section 37 stores a correction value for correcting color misregistration for each attribute of a sheet.

In this case, the third controller 36 receives a selection by the user as to whether or not to divert the correction value calculated in step A9 of the pre-job control process executed in the past to the current print job. When the user selects to divert the correction value calculated in the past to the current print job, the third controller 36 stops the processing in step A2 and subsequent steps.

A case where it is set in advance that step A8 of the pre-job control process is executed and step A9 is not executed will be described. In this case, the third controller 36 may correct the color misregistration only by executing step A8 of the pre-job control processing.

A case where it is set in advance that step A8 of the pre-job control processing is not performed and step A9 is performed will be described. In this case, the third controller 36 may correct the color misregistration only by executing step A9 of the pre-job control processing.

The third controller 36 may execute the pre-job control processing every predetermined number of printed sheets during execution of a job.

The third controller 36 may perform the pre-job control processing when the temperature and/or the humidity in the sheet feed trays 131 to 133, in the main body section 30, or in the environment where the image forming apparatus 1 is installed exceeds a predetermined value.

A case where a booklet or the like is printed in a print job and a plurality of types of sheets are target sheets will be described.

In this case, the third controller 36 switches the color misregistration correction value for correcting the color misregistration corresponding to the sheet in the page configuration order of the print job. In this case, the third controller 36 changes the control in the image formation on the basis of the physical property value of the target sheet, the color misregistration correction value corresponding to the physical property value, and the like. Specifically, the third controller 36 makes a correction using the average value of the color misregistration correction value in the print job, and executes image formation. Alternatively, the third controller 36 performs correction using the representative value of the color misregistration correction value in the print job, and executes image formation. Alternatively, the third controller 36 performs correction while switching a plurality of color misregistration correction value in the print job, and executes image formation.

A case where a plurality of print jobs are continuously printed in the image forming apparatus 1 will be described. In this case, in the pre-job control processing, the third controller 36 forms a plurality of types of charts corresponding to a plurality of print jobs. Next, the third controller 36 measures the color misregistration amounts of the plurality of types of patterns and calculates the respective color misregistration correction value.

In the pre-job control processing, the third controller 36 may form a chart for each sheet passing mode, measure the amount of color misregistration, and calculate the color misregistration correction value. The sheet passing mode includes single-sided printing, double-sided printing, and the like.

In the above-described pre-job control processing, the third controller 36 may form a chart and measure the color misregistration amount to calculate the color misregistration correction value, based on the transfer speed and/or the margin amount at the leading and trailing edges of the sheet.

The third controller 36 may store the color misregistration correction value in a table for each sheet, and store the table in the storage section 37.

When the number of color misregistration correction values stored in the storage section 37 is relatively large, the third controller 36 may average the values of the physical property values of the sheet or the color misregistration correction value that are close to each other, and store only the average value in the storage section 37.

A case where the physical property values of the first sheet sensed by the sensing device 20 are close to the physical property values of the second sheet stored in the storage section 37 will be described. In this case, the third controller 36 may use the color misregistration correction value for the second sheet as the color misregistration correction value for the first sheet.

A case where printing of a plurality of types of charts is required in order to calculate a color misregistration correction value will be described. In this case, the third controller 36 prints some of the plurality of types of charts. Next, the third controller 36 may use, for the remaining charts, the color misregistration correction value corresponding to a sheet having physical property values close to the physical property value of the target sheet of the print job.

Next, a during-job control process executed during execution of a print job in the image forming apparatus 1 will be described.

The third controller 36 cooperates with the program stored in the storage section 37 to execute the during-job control processing.

For example, when the post processing device 60 has a cutting processing function, the third controller 36 executes the during-job control processing.

FIG. 17 shows a flowchart of the during-job control processing.

(3-2. During-Job Control Processing)

The third controller 36 forms the job image of the print job and the chart on the target sheet (step B1). Specifically, the third controller 36 forms the chart at a position (margin) to be cut by the post processing device 60.

In step B1, the third controller 36 forms the chart having relatively small patches. The relatively small patches are, for example, the image reading patches P1 illustrated in FIG. 5C to FIG. 5E.

In step B1, the third controller 36 may form the chart having the image reading patch P1 illustrated in FIG. 5A and FIG. 5B if the chart can be formed in the margin part.

In step B1, the third controller 36 may form the chart in which a plurality of patches are arranged in the entire circumference of the sheet so that the color misregistration in the entire sheet can be measured.

In step B1, the third controller 36 may form the chart in which patches are arranged only in positions where the color misregistration characteristics in the sheet are easy to grasp. The place in the sheet where the color misregistration characteristics are easy to grasp is, for example, a place separated from the leading end of the sheet by a predetermined distance in the sub-scanning direction.

Next, the third controller 36 measures the color misregistration amount in the chart formed in step B1 by the measurement method determined in step A2 of the pre-job control processing (step B2).

Next, the third controller 36 determines whether or not the cumulative value of the amount of change in the color misregistration amount measured in step B2 from the start of the print job is larger than a predetermined second threshold (step B3). The predetermined second threshold is set in advance.

A case where the cumulative value of the amount of change in the color misregistration amounts is equal to or smaller than the second threshold (step B3; NO) will be described. In this case, the third controller 36 makes a correction so that the color misregistration amount becomes zero in the image deformation processing (step B4), and ends the present processing.

On the other hand, if the cumulative value of the amounts of change in color misregistration is more than the second threshold (step B3; YES), the third controller 36 interrupts the print job being executed (step B5).

Next, the third controller 36 executes the pre-job control processing (step B6).

Next, the third controller 36 resumes the print job interrupted in step B5 (step B7), and ends the present processing.

In step B1 of the above-described during-job control processing, the third controller 36 may not form the chart. In this case, in step B2, the third controller 36 measures the color misregistration amount on the basis of the formed job image.

Specifically, the third controller 36 extracts a spot having a feature such as an edge where color misregistration is easily visually recognized in the job image. The edge in which the color misregistration is easily visually recognized is, for example, an edge in which a plurality of colors overlap. Next, the third controller 36 measures the color misregistration amount at the extracted portion of the formed job image. Next, the third controller 36 determines whether the measured color misregistration amount exceeds a predetermined third threshold set in advance. If the measured color misregistration amount exceeds the third threshold, the third controller 36 ejects the printed matter having a color misregistration amount exceeding the third threshold as waste sheet, for example, from the sheet ejection tray 54. In this case, the third controller 36 re-prints the image formed on the sheet discharged as the waste sheet.

4. Modification Example

Next, a modification example of the present invention will be described.

Figure 18:
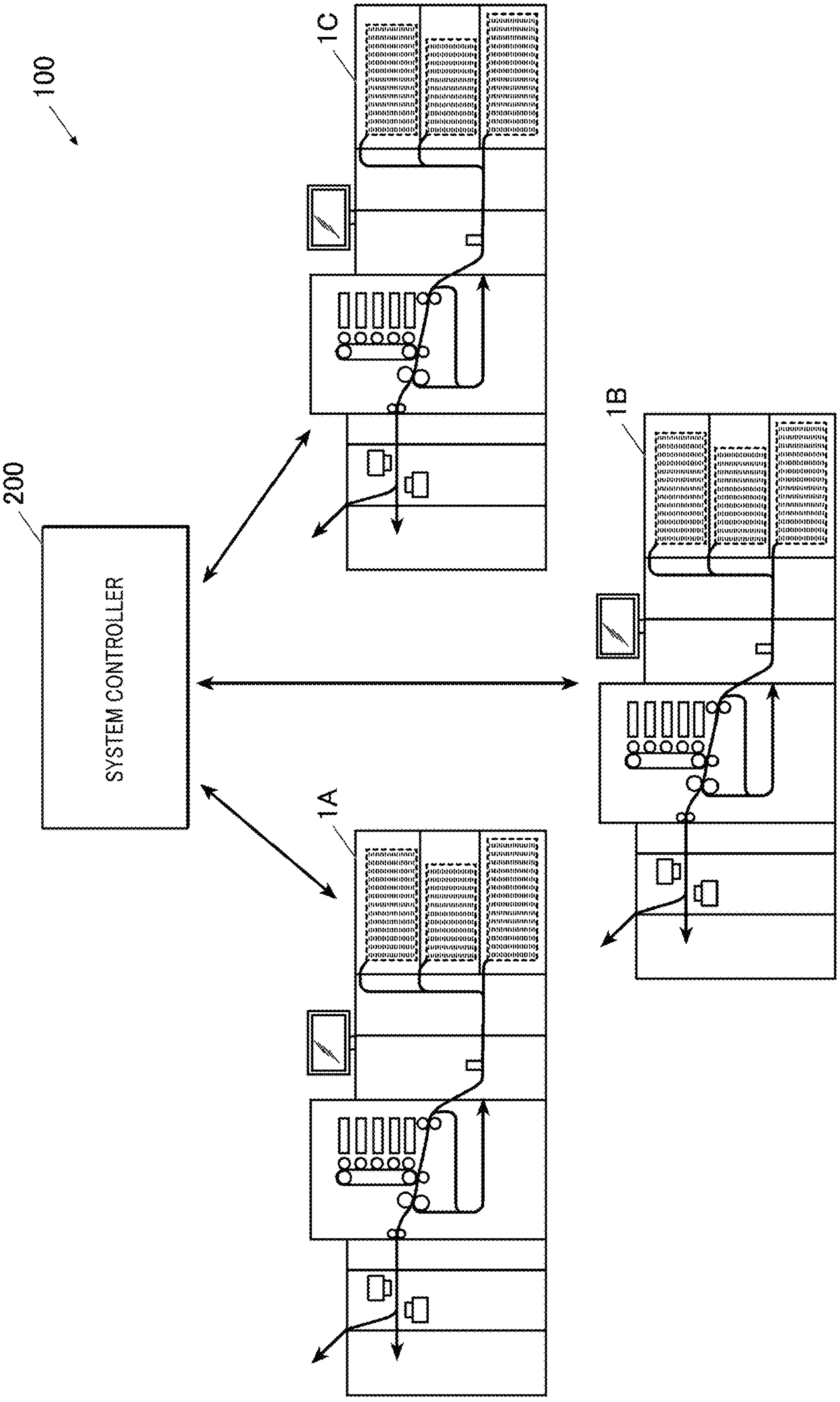
FIG. 18 is a schematic configuration diagram of an image forming system of a modification example.

FIG. 18 is a schematic configurational view of an image forming system 100 of the present modification example.

The image forming system 100 includes image forming apparatuses 1A, 1B, and 1C, a system controller 200, and the like.

The system controller 200 is communicably connected to the image forming apparatuses 1A, 1B, and 1C via a LAN or the like.

In the image forming system 100, the system controller 200 stores the relationship between the color misregistration correction value for correcting the color misregistration amounts stored in the image forming apparatuses 1A, 1B, and 1C and the type of sheet. The system controller 200 controls printing of a chart and measurement of a color misregistration amount for calculating a color misregistration correction value in each image forming apparatus.

A case where the image forming system 100 executes a print job including various kinds of processing such as high-volume processing, multicolor processing, foil stamping, and lamination will be described.

In this case, the system controller 200 distributes and transmits the print job to the image forming apparatus that holds the sheet and the color misregistration correction value that meet the requirements of the print job.

For example, the system controller 200 transmits, to the image forming apparatus 1A, a print job in which a sheet for which only the image forming apparatus 1A stores the color misregistration correction value is set as a target sheet, and causes the image forming apparatus 1A to execute the print job.

A case where a print job in which a plurality of types of sheets are set as target sheets is executed and there is no image forming apparatus that stores the color misregistration correction value corresponding to the plurality of types of sheets will be described. In this case, the system controller 200 transmits the print job to the image forming apparatus that performs the least amount of processing for calculating the color misregistration correction value corresponding to the plurality of types of sheet. The image forming apparatus forms a chart on a target sheet and measures a color misregistration amount in order to calculate a missing color misregistration correction value. Thereafter, the image forming apparatus makes a correction using the calculated color misregistration correction value and executes the print job.

Based on the color misregistration correction value stored in the image forming apparatuses 1A, 1B, and 1C, the system controller 200 may transmit the print job to the image forming apparatus having the best characteristics for the target sheet of the print job, and cause the image forming apparatus to execute the print job.

5. Effects

As described above, the image forming apparatus 1 according to the present embodiment includes: an image forming section 34 to form images in a plurality of colors on a sheet by an intermediate transfer method; an acquiring section (third controller 36) to acquire sheet attribute information indicating an attribute of the sheet; a measurement section (third controller 36) to measure a color misregistration amount in a predetermined position in a surface of the sheet on which the images are formed by the image forming section 34; and a controller (third controller 36) to perform control for correcting at least the color misregistration in the surface of the sheet on the basis of the sheet attribute information acquired by the acquiring section and the color misregistration amount measured by the measurement section.

Thus, the color misregistration can be corrected according to the sheet attribute information.

Therefore, it is possible to accurately correct the color misregistration in the image formed on the sheet.

In the image forming apparatus 1 according to the present embodiment, the image forming section 34 includes a registration section 346 configured to convey the sheet to a transfer section configured to transfer an image onto the sheet, and a fixing section 344 configured to fix the image onto the sheet, and the controller (third controller 36) corrects color misregistration by adjusting a conveyance speed in the registration section 346 and/or a conveyance speed in the fixing section 344.

Thus, a relatively large color misregistration (larger than the first threshold) can be corrected by adjusting the registration speed and/or the fixing speed.

In the image forming apparatus 1 according to the present embodiment, the controller (third controller 36) performs image deformation processing for correcting color misregistration.

Thus, relatively small (equal to or smaller than the first threshold) color misregistration can be corrected by the image deformation processing.

In the image forming apparatus 1 according to the present embodiment, the measurement section (the third controller 36) measures the color misregistration amount after the controller (the third controller 36) adjusts the conveyance speed in the registration section 346 and/or the conveyance speed in the fixing section 344.

Thus, the amount of color misregistration that could not be corrected through correction by adjustment of the registration speed and/or the fixing speed can be measured.

In the image forming apparatus 1 according to the present embodiment, the controller (third controller 36) corrects the amount of color misregistration after the adjustment of the conveyance speed in the registration section 346 and/or the conveyance speed in the fixing section 344 by image deformation processing.

Thus, the color misregistration amount that could not be corrected by the correction through the adjustment of the registration speed and/or the fixing speed can be further corrected by the image deformation processing.

In the image forming apparatus 1 according to the present embodiment, the measurement section (third controller 36) measures, as the color misregistration amount, an integral value of the color misregistration amounts among the plurality of colors.

Thus, the integral value of the color misregistration amounts among the plurality of colors can be corrected.

In the image forming apparatus 1 according to the present embodiment, the measurement section (third controller 36) measures the maximum value of the color misregistration amounts among the plurality of colors as the color misregistration amount.

Thus, the maximum value of the color misregistration amount among the plurality of colors can be corrected.

The image forming apparatus 1 according to the present embodiment includes the storage section 37 that stores, for each attribute of the sheet, a correction value for correcting the color misregistration.

Thus, since the print job can be executed by diverting the correction value calculated in the past, the processing of calculating the correction value can be omitted.

In the image forming apparatus 1 according to the present embodiment, the acquiring section (third controller 36) acquires, as the sheet attribute information, a physical property value of the sheet sensed by the sensing section 22.

Thus, the color misregistration can be corrected according to the physical property value of the sheet.

Although an embodiment of the present invention has been specifically described above, the present invention is not limited to the embodiments described above, and various modifications can be made without departing from the spirit and scope of the invention.

For example, the color information detection device 40 may be configured to perform a curl correction process or a humidification process on the sheet.

The image forming apparatus 1 may be configured to be able to transmit and receive information for mutual cooperation with a print controller (not shown) that performs print job generation and print management, another image forming system (not shown), a business management system (not shown), and the like.

In the present embodiment, the third controller 36 of the main body section 30 integrally controls the entire image forming apparatus 1, but the present invention is not limited thereto. A control device may be separately provided, and a controller of the control device may integrally control the entire image forming apparatus 1.

Besides, the detailed configuration of each device constituting the image forming apparatus 1 and the detailed operation of each device can also be appropriately modified without departing from the spirit and scope of the present invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-077138, filed on May 9, 2023 including description, claims, drawings and abstract is incorporated herein by reference.

What is claimed is:

1. An image forming apparatus comprising:

an image former that forms an image in a plurality of colors on a sheet by an intermediate transfer method, the image including a chart for measuring a color misregistration amount during image formation by the image forming apparatus;

a hardware processor that acquires sheet attribute information indicating one selected from the group consisting of basis weight of the sheet, size of the sheet, paper type of the sheet, stiffness of the sheet, moisture content of the sheet, surface smoothness of the sheet, surface evenness of the sheet, specific gravity of the sheet, and conductivity of the sheet; and a detector located on a downstream side of the image former in a sheet conveyance direction, the detector being configured to detect the image formed on the sheet, wherein, the hardware processor measures the color misregistration amount at a predetermined position in a surface of the sheet on which the chart is formed by the image former, the measurement of the color misregistration amount being performed based on the chart formed on the sheet by the image former and detected by the detector;

the hardware processor performs control for correcting at least the color misregistration on the surface of the sheet, based on the acquired sheet attribute information and the measured color misregistration amount; and the hardware processor determines, based on the acquired sheet attribute information, a number of patch or patches included in the chart, an arrangement positions of the patch or patches and a shape of a pattern included in the patch or patches corresponding to a maximum color misregistration amount assumed from the sheet attribute information.

2. The image forming apparatus according to claim 1, wherein, the image former includes, a registration part that conveys the sheet to a transferer that transfers an image onto the sheet, and a fixer that fixes the image to the sheet, and the hardware processor corrects the color misregistration by adjusting a conveyance speed in the registration part and a conveyance speed in the fixer.

3. The image forming apparatus according to claim 2, wherein the hardware processor measures the color misregistration amount after adjustment of the conveyance speed in the registration part and the conveyance speed in the fixer.

4. The image forming apparatus according to claim 3, wherein the hardware processor corrects, by image deformation processing, the color misregistration amount after the adjustment of the conveyance speed in the registration part and the conveyance speed in the fixer.

5. The image forming apparatus according to claim 1, wherein the hardware processor performs image deformation processing to correct color misregistration.

6. The image forming apparatus according to claim 1, wherein the hardware processor measures an integral value of the color misregistration amount among the plurality of colors as the color misregistration amount.

7. The image forming apparatus according to claim 1, wherein the hardware processor measures a maximum value of the color misregistration amount among the plurality of colors as the color misregistration amount.

8. The image forming apparatus according to claim 1, further comprising a storage that stores a correction value to correct the color misregistration for each attribute of the sheet.

9. The image forming apparatus according to claim 1, wherein the hardware processor acquires the sheet attribute information from a sensor.

10. The image forming apparatus according to claim 1, wherein, the image former includes, a registration part that conveys the sheet to a transferer that transfers an image onto the sheet, and a fixer that fixes the image to the sheet, and the hardware processor corrects the color misregistration by adjusting a conveyance speed in the registration part.

11. The image forming apparatus according to claim 10, wherein the hardware processor measures the color misregistration amount after adjustment of the conveyance speed in the registration part.

12. The image forming apparatus according to claim 11, wherein the hardware processor corrects, by image deformation processing, the color misregistration amount after the adjustment of the conveyance speed in the registration part.

13. The image forming apparatus according to claim 1, wherein, the image former includes, a registration part that conveys the sheet to a transferer that transfers an image onto the sheet, and a fixer that fixes the image to the sheet, and the hardware processor corrects the color misregistration by adjusting a conveyance speed in the fixer.

14. The image forming apparatus according to claim 13, wherein the hardware processor measures the color misregistration amount after adjustment of the conveyance speed in the fixer.

15. The image forming apparatus according to claim 14, wherein the hardware processor corrects, by image deformation processing, the color misregistration amount after the adjustment of the conveyance speed in the fixer.

16. The image forming apparatus according to claim 1, wherein the detector is at least one of:

a color information detection device configured to detect color information of the sheet conveyed from the image former and output the obtained detection result to the hardware processor, and an image reading device configured to read the sheet conveyed from the image former and output the obtained read image to the hardware processor.

17. The image forming apparatus according to claim 1, wherein the patch is at least one of:

a first patch in which rectangular patterns formed of black or white at both ends and single toners of at least two of yellow, magenta and cyan between the both ends are arranged in a line;

a second patch including two of the first patches orthogonal to each other;

a third patch including rectangular patterns each formed with single toners of yellow, magenta, and cyan surrounded by black;

a fourth patch including halftone rectangular patterns formed with single toners of yellow, magenta, cyan, and black, wherein the halftone rectangular patterns overlap each other without deviation in an original image data of the fourth patch, and the halftone rectangular patterns overlap each other while being shifted by the color misregistration amount when a color misregistration occurs at the time of forming the fourth patch;

a fifth patch including a plurality of first units each including a first pattern formed with one of yellow, magenta or cyan toner located on a downstream side in the sheet conveyance direction, and having an upwardly convex shape when the sheet conveyance direction is defined as an upward direction, a second pattern formed with another one of yellow, magenta or cyan toner located on a upstream side in the sheet conveyance direction, and having a downwardly convex shape when the sheet conveyance direction is defined as the upward direction, and a third pattern formed of a concealing color toner, and superimposed on the first pattern and the second pattern so as to cover the first pattern and the second pattern;

a sixth patch including a plurality of second units each including a fourth pattern formed with one of yellow, magenta or cyan toner located on the downstream side in the sheet conveyance direction, and having the downwardly convex shape, a fifth pattern formed with another one of yellow, magenta or cyan toner located on the upstream side in the sheet conveyance direction, and having the upwardly convex shape, and a sixth pattern formed of the concealing color toner, and superimposed on the fourth pattern and the fifth pattern so as to cover the fourth pattern and the fifth pattern; or a seventh patch including a plurality of third units each including a seventh pattern formed with one of yellow, magenta or cyan toner located on the downstream side in the sheet conveyance direction, and having a rectangular shape, an eighth pattern formed with another one of yellow, magenta or cyan toner located on the upstream side in the sheet conveyance direction, and having a rectangular shape, and a ninth pattern formed of the concealing color toner, and superimposed on the seventh pattern and the eighth pattern so as to cover the seventh pattern and the eighth pattern.

18. A non-transitory recording medium including a program that controls a computer of an image forming apparatus comprising an image former for forming images in a plurality of colors on a sheet by an intermediate transfer method to functions as:

a hardware processor that acquires sheet attribute information indicating one selected from the group consisting of basis weight of the sheet, size of the sheet, paper type of the sheet, stiffness of the sheet, moisture content of the sheet, surface smoothness of the sheet, surface evenness of the sheet, specific gravity of the sheet, and conductivity of the sheet, wherein, the image includes a chart for measuring a color misregistration amount during image formation by the image forming apparatus, the hardware processor measures the color misregistration amount at a predetermined position in a surface of the sheet on which the chart is formed by the image former, the measurement of the color misregistration amount being performed based on the chart formed on the sheet by the image former and detected by a detector;

the hardware processor performs control to correct at least the color misregistration on the surface of the sheet based on the acquired sheet attribute information and the measured color misregistration amount; and the hardware processor determines, based on the acquired sheet attribute information, a number of patch or patches included in the chart, an arrangement positions of the patch or patches and a shape of a pattern included in the patch or patches corresponding to a maximum color misregistration amount assumed from the sheet attribute information.

* * * * *